United States Patent [19]

Greene et al.

[11] Patent Number: 5,055,402
[45] Date of Patent: Oct. 8, 1991

[54] REMOVAL OF METAL IONS WITH IMMOBILIZED METAL ION-BINDING MICROORGANISMS

[75] Inventors: Benjamin Greene; Robert A. McPherson, both of Las Cruces; Dennis W. Darnall, Mesilla; Jorge L. Gardea-Torresdey, Las Cruces, all of N. Mex.

[73] Assignee: Bio-Recovery Systems, Inc., Las Cruces, N. Mex.

[21] Appl. No.: 293,389

[22] Filed: Jan. 4, 1989

[51] Int. Cl.$^5$ ............... C12N 11/00; C12N 11/18; C12N 1/12; C02F 1/42
[52] U.S. Cl. .................... 435/174; 210/681; 210/687; 210/688; 435/175; 435/176; 435/252.1; 435/255; 435/257; 435/262; 435/803; 435/942; 435/946
[58] Field of Search ............... 210/601, 681, 683, 684, 210/685, 687, 688; 435/174, 175, 176, 177, 178, 180, 182, 262, 803, 942, 946, 252.1, 254, 255, 257

[56] References Cited

U.S. PATENT DOCUMENTS

4,352,883 10/1982 Lim .................... 435/178

FOREIGN PATENT DOCUMENTS

49-121355 11/1974 Japan .
49-131984 12/1974 Japan .
50-51481 5/1975 Japan .
50-51988 5/1975 Japan .

OTHER PUBLICATIONS

T. Horikoshi et al., "Uptake of Uranium by Chlorella Regularis", *Agric. Biol. Chem.* 43, pp. 617–623, 1979.
M. Tsezos and B. Volesky, "Biosorption of Uranium and Thorium", *Bio-Techno. Bio-Eng.*, 23, p. 583, 1981.
J. Ferguson and B. Bubela, "The Concentration of Cu(II), Pb(II) . . . ," *Chem. Geol.* 13, p. 163, 1974.
D. Darnall et al., "Gold Binding to Algae", *Biohydrometallurgy*, Kelley, D. P. and Norris, P. R., editors, Science and Technology Letters, Kew Surrey, England, pp. 487–498, 1988.
D. Darnall et al., "Trace Metal Removal from Aqueous Solution", *Special Publication No.* 61, The Royal Society of Chemistry, Burlington House London, p. 3, 1986.
R. G. Pearson, "Hard and Soft Acids and Bases", *J. Amer. Chem. Soc.* 85, pp. 3533–3534, 1963.
J. E. Hyheey, "Inorganic Chemistry: Principles of Structure and Reactivity", Harper and Row, New York, 1972.
Nakajima et al., "Recovery of Uranium by Immobilized Microorganisms", *Eur. J. Appl. Microbiol. Biotechool.* 16, pp. 88–91, 1982.
P. K. Robinson, et al., "Immobilized Algae; A Review", *Process Biochemistry*, vol. 8, p. 115, 1986.
R. Bansal et al., "Active Carbon", *Marcel Dekker, Inc.*, New York, Chap. 1, 1988.
"Metal Finishing Guidebook Directory", 1988, *Metals and Plastics Publications, Inc.*, Hackensack, N.J., pp. 240–242.

*Primary Examiner*—David M. Naff
*Attorney, Agent, or Firm*—Skjerven, Morrill, MacPherson, Franklin & Friel

[57] ABSTRACT

A composition for removing metal ions from aqueous solution is prepared by immobilizing metal ion-binding microorganisms such as algae, washing the immobilized microorganisms, drying the washed immobilized microorganisms and heating the dried immobilized microorganisms to a temperature of about 300° to about 500° C. for a time sufficient to provide a stable composition that is non-swelling in aqueous solution. The composition preferentially adsorbs precious metal ions from an aqueous solution containing concentrations of base metal ions and/or other dissolved materials several orders of magnitude greater than the concentration of the precious metal ions. The composition can also be used to extract precious metal ions from geothermal fluids.

139 Claims, 6 Drawing Sheets

REMOVAL OF METAL IONS WITH IMMOBILIZED METAL ION-BINDING MICROORGANISMS

BACKGROUND OF THE INVENTION

1. Field of the Invention

This invention relates to the extraction and recovery of metal ions from an aqueous solution and in particular to the extraction of metal ions from an aqueous solution at either ambient or elevated temperatures using a composition containing immobilized microorganisms, and to the recovery of the bound metal ions from the composition.

2. Description of the Prior Art

The binding of metal ions to microorganisms and the application of this phenomenon to extract metals from an aqueous solution are rapidly growing areas of interest. Two distinct approaches to extraction of metals from an aqueous solution have been used. The first approach uses living organisms and the second approach uses a nonviable biomass Metal ion binding to living cells can occur either through surface adsorption or active intracellular accumulation. Metal ion binding to nonviable cells, however, is presumed to occur exclusively through surface adsorption.

Growing algae in ponds or lagoons for wastewater treatment is an example of using living organisms to extract metal ions from an aqueous solution. The basic approach has been to flow polluted waters through a lagoon in which an algal bloom is present. Because the algae adsorb heavy metal ions, the effluent waters from such a system have lowered heavy metal ion concentrations.

There are significant practical limitations to methods which employ living algal systems. The most significant limitation is that algal growth is inhibited when the concentrations of metal ions in the water are too high or when significant amounts of metal ions are sorbed by the algae.

Methods for water-treatment that employ nonviable cells, a biomass, are not complicated by the problem of attempting to maintain algal growth under adverse circumstances. In fact, heat-killed cells display a binding capacity for uranium(VI) three times greater than that measured for living cells. See for example, T. Horikoshi, A Nakajima and T. Sakaguchi, *Agric. Biol. Chem.*, 43, p. 617, 1979. The biomass is treated merely as another reagent, a surrogate ion-exchange resin. The binding, or biosorption, of metal ions by the biomass results from coordination of the ions to various functional groups in or on the cell. These chelating groups—contributed by carbohydrates, lipids and proteins—include carboxyl, carbonyl, amide, hydroxyl, phenolic, imidazole, phosphate, amino, thiol, and thioether moieties.

Nonliving *Rhizopus arrhizus*, a common fungus, has been used for binding of U(VI) and Th(IV) in an aqueous solution. See for example, M. Tsezos and B. Volesky,. *Bio-Technol. Bio-Eng.*, 23, p. 583 (1981). Frozen or freeze-dried preparations of Ulothrix, Chlamydomonas and *Chlorella vulgaris* have been used to remove $Cu^{2+}$, $Pb^{2+}$ and $Zn^{2+}$ from an aqueous solution. The binding of these metal ions was greater at pH 7 than at pH 3. Moreover, NaCl and $Mg(NO_3)_2$ inhibited the binding of zinc, suggesting that selective adsorption of $Pb^{2+}$ or $Cu^{2+}$ was possible. See for example, J. Ferguson and B. Bubela, *Chem. Geol.* 13, p. 163 (1974).

The algal species *Rhodymenia palmata* and *Phorphyra yezoensis*, both red marine algae; *Laminaria japonica, Eisenia bicyclis*, and *Macrocystis pyrifera*, all brown marine algae; *Cyanidium caldarium*, an acidophilic alga whose classification may be either green or red; *Spirulina platensis*, a freshwater blue-green alga; and *Chlorella pyrenoidosa* and *Chlorella vulgaris*, both freshwater green algae, have been found to adsorb tetrachloroaurate(III). However, the kinetics, pH dependencies and binding capacities differ amongst the algal species. Further, temperature was found to strongly affect gold binding to *Spirulina platensis* and to *Chlorella pyrenoidosa*. Increased gold(III) binding and reduction of gold(III) to gold(0) occurred as the temperature was increased from 0° C. to 60° C. This temperature dependence has been demonstrated for both free algal cells in batch experiments and immobilized algae See for example, D. Darnall, B. Greene and J Gardea-Torresdey, "Gold Binding to Algae" in *Biohydrometallurgy*, Kelley, D.P. and Norris, P.R., Editors, Science and Technology Letters, Kew Surrey, England, pp. 487–498 (1988).

*Chlorella vulgaris* has accumulated both gold(I) and gold(III) from aqueous solutions with high affinity. The degree of gold adsorption strongly depends on competing ligands present in the solution. Tetrachloroaurate(III) and gold(I) sodium thiomalate are rapidly adsorbed by the algal cells over a wide pH range, whereas dicyanoaurate(I) is bound more slowly and in a highly pH-dependent manner, with maximum binding observed near pH 3.0. Under certain conditions, the level of gold accumulation by *Chlorella vulgaris* approaches 10% of the organism's dry weight. Experiments suggest that the alga rapidly reduces gold(III) to gold(I) and that the algal-bound gold is slowly reduced to gold(0).

In addition to the specific algae cited, the bluegreen, green, brown, euglenoids, stonewarts, golden, dinoflagellates and red algae and other microorganisms such as bacteria, fungi, yeast or other plant materials have metal ion-binding capability.

The cell wall composition of members of the various algal groups is known to be diverse. The surface of the alga *Chlorella vulgaris*, a freshwater green alga, is literally a mosaic of metal ion binding sites—sites which differ in affinity and specificity. Both anions and cations can be bound. There are sites with high affinity for "hard" metal ions such as $Al^{3+}$ and $Fe^{3+}$, and there are sites with equally high affinities for such "soft" ions as $Hg^{2+}$, $Ag^+$ and $Au^{3+}$. Selectivity is gained by judicious manipulation of solution parameters. For instance, chromate/dichromate, which are bound negligibly at pH values around neutrality, can be bound completely at pH 2.0. See for example, D. Darnall et al., "Recovery of Heavy Metal Ions by Immobilized Algae", *Trace Metal Removal from Aqueous Solution, Special Publication* No. 61, The Royal Society of Chemistry, Burlington House London, p. 3 (1986).

The difference in algal binding capacities for different metal ions is characterized using the concept of hard, intermediate and soft metal ions. If A is a metal ion and :B is a ligand, the stability of the complex, A:B, depends on the soft or hard character of A and :B. Metal ions are classified as hard or soft according to the order of their formation constant with the ligands $F^-$, $Cl^-$, $Br^-$, and $I^-$. For example, a metal ion is classified as hard if the stability of its complexes increases according to ·

$I^- < Br^- < Cl^- < F^-$ and classified as soft if the stability of its complexes increases according to $F^- < Cl^- < Br^- < I^-$.

Some metal ions show intermediate behavior, and are classified as intermediate ions. For a more detailed discussion of hard, intermediate and soft metal ions, see for example, R.G. Pearson, "Hard and Soft Acids and Bases," *J. Amer. Chem. Soc.* 85, pp. 3533–3539 (1963) and J.E. Huheey, *Inorganic Chemistry: Principles of Structure and Reactivity*, Harper and Row, New York (1972).

As used herein "hard metal ions" refers to the group of metal ions consisting of $Cs^+$, $Rb^+$, $Ba^{2+}$, $Ra^{2+}$, $B^{3+}$, $Ge^{4+}$, $Se^{4+}$, $Se^{6+}$, $V^{5+}$, $Mn^{2+}$, $Mn^{7+}$, $Mo^{6+}$, $W^{6+}$, $Re^{7+}$, $Y^{3+}$, $Sn^{4+}$, $Al^{3+}$, $Sc^{3+}$, $Ga^{3+}$, $In^{3+}$, $La^{3+}$, $Cr^{6+}$, $Cr^{3+}$, $Co^{3+}$, $Fe^{3+}$, $As^{3+}$, $As^{5+}$, $Ir^{3+}$, $Ce^{4+}$, $Gd^{3+}$, $Lu^{3+}$, $Th^{4+}$, $U^{4+}$, $Pu^{4+}$, $Ti^{4+}$, $Zr^{4+}$, $U^{+6}$, $Hf^{4+}$, and the other metal ions from the lanthanide series. "Intermediate metal ions" refers to the group of metal ions consisting of $Fe^{2+}$, $Co^{2+}$, $Ni^{2+}$, $Cu^{2+}$, $Zn^{2+}$, $Sn^{2+}$, $Pb^{2+}$, $Sb^{3+}$ and $Bi^{2+}$. "Soft metal ions" refers to the group of metal ions consisting of $Pd^{2+}$, $Pt^{2+}$, $Rh^{3+}$, $Ir^{2+}$, $Ru^{3+}$, $Os^{2+}$, $Pt^{+4}$ $Cu^+$, $Ag^+$, $Au^{3+}$, $Au^+$, $Cd^{2+}$, $Hg^+$ and $Hg^{2+}$.

The binding site diversity of algae gives the algae a broad applicability not found in conventional ion-exchange resins A second major advantage with algae is that, in contrast to many conventional resins, the algal cells have relatively little affinity for $Ca^{2+}$ and $Mg^{2+}$. Thus, in hard-water treatment applications, the algae are less prone to saturation by these nontoxic ions. See for example, D. Darnall et al., "Recovery of Heavy Metals By Immobilized Algae," at pg. 3.

Metal ions can also be divided into three classes based upon the pH dependence of metal ion-binding to algae. The first class, Class I, is comprised of metal ions which are tightly bound at pH>5 and which can be stripped (or are not bound) at pH<2. Many ions fall into this class: $Al^{+3}$, $Cu^{+2}$, $Pb^{+2}$, $Cr^{+3}$, $Cd^{+2}$, $Ni^{+2}$, $Co^{30\ 2}$, $Zn^{+2}$, $Fe^{+3}$, $Be^{+2}$ and $UO_2^{+2}$. The second class, Class II, is comprised of metallic anions which display the opposite behavior of Class I metal ions, i.e., they are strongly bound at pH<2 and weakly bound or not bound at all at pH values near 5. Ions in Class II include $PtCl_4^{-2}$, $CrO_4^{-2}$, $MoO_4^{-2}$ and $SeO_4^{-2}$. The third class of metal ions includes those metal ions for which there is no discernable pH dependence for binding between pH 6 and pH 1 and includes $Ag^+$, $Hg^{+2}$ and $AuCl_4^-$. These three ions are among the most strongly bound of all metal ions. FIGS. 1A, 1B and 1C illustrate data for the three classes of metal ions. For a more detailed discussion of the pH dependence of metal ion binding to algae, see for example, D. Darnall et al., "Recovery of Heavy Metals By Immobilized Algae," pp. 4–23.

The data in FIGS. 1A, 1B and 1C were collected by incubating Chlorella cells (5 mg/ml) in 0.1 mM solutions of the metal ions in 0.05 M acetate buffer. The buffer was added to maintain accurate pHs between pH 4 and 6. Because acetate is a good ligand for many of the metal ions, increased binding is observed in the absence of the buffer. Furthermore, complete binding (greater than 99%) of metal ions in all three classes is obtained when solutions are passed through columns containing immobilized algae rather than by simply incubating the algae in metal-containing solutions.

The pH dependence of metal ion binding to algae should make possible repeated cycles consisting of binding metal ions to algae and subsequently stripping the bound metal ions from the algae much like recycling an ion-exchange resin. Unfortunately, when algae cells are packed into a column and waters containing metal ions are passed through the column, the algae clump together and significant flow cannot be achieved even with high pressures. This problem is alleviated by immobilizing the algae. As used herein, "immobilization of algae," "immobilizing the algae," "immobilized algae" and similar terms refer to algae constrained within a composition. The immobilized algae can then be packed into columns through which high flow can be achieved.

Several different methods are known for immobilizing algae. Nakajima et al. (see Nakajima et al., "Recovery of Uranium By Immobilized Microorganisms," *Eur. J. Appl. Microbiol. Biotechol.*, 16, pp. 88–91 (1982)) investigated a method for immobilizing Chlorella and Streptomyces in polyacrylamide, toluene diisocyanate, glutaraldehyde, agar, cellulose acetate and alginate Cells immobilized with polyacrylamide, toluene diisocyanate, glutaraldehyde and agar had the highest adsorption abilities. The cells immobilized with polyacrylamide had the best mechanical properties, such as rigidity. Nakajima et al. selected the polyacrylamide method as the most appropriate method for immobilization of algae. The polyacrylamide-immobilized alga functioned satisfactorily for removing uranium from both fresh and sea water at ambient temperatures. The adsorption of uranium by the immobilized cells was endothermic. However, the polyacrylamide composition is not very durable At alga concentrations above 20% (on a dry weight basis), the material is extremely prone to fracture.

An alternative to polyacrylamide-embedded material is an alga-silica composition. (See Darnall et al., "Recovery of Heavy Metals By Immobilized Algae," pp. 18–21). While the alga-silica composition is extremely hard ("rocklike") and resists fragmentation, the composition is porous so that all potential metal ion binding sites are capable of being occupied. The algal content of the polymer can be made as high as 90% (on a dry weight basis).

The alga-silica material functions as a chromatographic matrix and is highly durable. The material has been subjected to as many as 40–50 cycles of binding and elution (using $Au^{3+}$) without observing any decrease in binding capacity. Furthermore, storage at room temperature for as long as two years at pHs ranging from less than about 1 to about 3 has no deleterious effect on the binding capacity of either gold or copper ions. The latter observation suggests that the silica-immobilized algal cells are not readily susceptible to microbial degradation. As the storage pH increases above about 3, the storage medium must be sterile or a growth inhibitor must be added to prevent the growth of unwanted microorganisms.

Other methods for algae immobilization have been investigated for application in areas other than extraction of metals from aqueous solutions. These methods for algae immobilization include use of alginate, polyurethane foam blocks, glass beads, agar, polyurethane, carrageenan and combinations of these substances. For a more detailed description of these alternative methods of immobilization see for example, P.K. Robinson, et al. "Immobilized Algae; A Review," *Process Biochemistry*, Vol. 8, p. 115 (1986).

The pH dependence of metal ion binding to algae, as indicated above, can be used to recover metal ions extracted from the aqueous solution by the algal compositions. For example, a column packed with beads of the alga-silica composition has been used to extract individual metal ions from an aqueous solution containing a mixture of metal ions To separate the individual ions from a mixture of $Zn^{2+}$, $Cu^{2+}$, $Hg^{2+}$, and $AuCl_4^-$, the metal ions were loaded on a short column of immobilized *C. vulgaris* at pH 6.0. After washing the column thoroughly at the same pH, $Zn^{2+}$ and $Cu^{2+}$ were sequentially eluted by means of a pH gradient. The $Hg^{2+}$ was then collected by elution with 0.5 M 2-mercaptoethanol at pH 2 and gold was collected by elution with the same reagent at pH 5.0. (See Darnall et al., "Recovery of Heavy Metal Ions by Immobilized Algae.")

The silica-algae composition is satisfactory for the recovery of metal ions in an aqueous solution when the pH values are less than 7. However, in some applications metal ions or complexes of metal ions must be recovered from an alkaline solution or a high temperature solution. Also, an alkaline eluent may be required to effectively strip metal ions bound to immobilized algae.

The previously described silica-algae compositions are not suitable for recovery of metal ions in aqueous solutions having temperatures greater than about 50°-100° C. because the compositions deteriorate as the temperature increases. In an aqueous solution having a temperature of about 160° C., the silica-algae composition disintegrates within about one hour. This is because both the silica and the algae in the silica-algae composition hydrolyze at higher temperatures. Moreover, even at ambient temperatures, the silica-algae composition eventually hydrolyzes at pH values above 7 making the material unsuitable for recovery of metal ions in solutions having alkaline pHs. Hence, the silica-algae composition is not suitable for (i) the recovery of metal ions from an aqueous solution at high temperatures; (ii) the recovery of metal ions from an aqueous solution at alkaline pHs; or (iii) the extraction of metal ions bound to the composition using an eluent having a pH greater than 7.

The unique characteristics of algae and other materials, such as bacteria, fungi and plant materials, for binding metal ions suggest that a means for immobilization of these materials suitable for use with alkaline solutions and high temperatures might provide a mechanism for concentrating and removing metal ions from all aqueous solutions rather than certain aqueous solutions, as previously described.

Another prior art method for recovering gold cyanide complexes uses activated carbon. R. Bansal et al., *Active Carbon,* Marcel Dekker, Inc., New York, Chap. 1 (1988). Usually, charcoal is made by first heating biologically derived materials at temperatures of 400-800° C. in a continuous stream of an inert gas. The charcoal formed by the initial heating does not have high adsorption capacity compared to activated carbon because charcoal has a poorly developed pore structure and low surface area. The charcoal is heated at temperatures of 850° C. to 1100° C. in the absence of air to produce activated carbon.

An alternative method of producing activated carbon uses a chemical activation process whereby the biological material is mixed with activating agents such as phosphoric acid, zinc chloride, sulfuric acid, or other chemicals. In this process the material is then heated at temperatures between 400° and 600° C. in the absence of air and then the material is cooled and washed to remove the activating agent After washing, the material is further heated at temperatures of 400° to 800° C.

The binding of gold cyanide to activated carbon is exothermic with the gold binding capacity of the activated carbon decreasing by nearly an order of magnitude as the temperature increases from 22° C. to 79° C.

The exothermic adsorption reaction behavior of activated carbon is the basis for extraction of bound gold from activated carbon. Specifically, the activated carbon is used to adsorb gold cyanide at ambient temperatures and then the temperature of the activated carbon is elevated in the presence of an eluting reagent, such as cyanide, to strip the bound gold from the activated carbon Accordingly, activated carbon is ineffective for removing gold from an aqueous solution at temperatures above 80°-100° C.

In addition to heating biological material to form active carbon, some investigators have heated compositions containing microorganisms to produce water insoluble particles In one published experiment, 100 grams of yeast cells were mixed with 0.5 grams of a water soluble polymer. (Japanese Laid-Open Patent Publication No. 49-121355, entitled "Method of Treating Waste Water By Water-Insoluble Microorganism Cells" of Kobayashi et al., dated Nov. 20, 1974.) The mixture was air dried to form a powder of about one millimeter thick particles. Using this procedure, particles containing immobilized yeast cells were formed using several different water soluble polymers The investigators reported that the particles were heated at temperatures ranging from 120° C. for one hour to 160° C. for two hours to form the water insoluble particles. The temperature and the duration of the heating were selected based upon the water soluble polymer used to form the composition. To demonstrate the insoluble nature of the particles, the particles were placed in 60° C. water for three hours. The investigators stated that most of the particles maintained their integrity after the three hour exposure This result suggests that these compositions are likely to disintegrate upon exposure to high temperature solutions for several days or weeks.

Kobayashi et al. also mixed methyl vinyl ether:maleic anhydride copolymer with 10 grams of a green alga. Most of the moisture in the mixture was removed and then the mixture was passed through a small orifice to form a thread shape. The thread was cut into minute particles. After the particles were dried, Kobayashi et al. heated the dried particles at 120° C. for one hour to form water insoluble particles.

In yet another experiment by Kobayashi et al. to form water insoluble particles, 100 grams of bread yeast were mixed with particles of methyl vinyl ether:maleic anhydride copolymer in water and then heated at 120° C. for one hour. This process was repeated to produce insoluble particles of about 0.5 mm diameter. Ten grams of the insoluble particles were placed in a glass tube and an aqueous solution containing 10 ppm of Cd derived from $CdCl_2$ was passed through the column 500 milliliters at a time. The flow rate through the column was about 700 milliliters per hour. The effluent from the column was analyzed and Kobayashi reported that cadmium was not detected until passage of the thirteenth 500 milliliter sample through the column. The binding capacity of the particles was 0.65% (gm Cd/gm material).

In another immobilization process, as described in the May 9, 1975 Japanese Laid-Open Patent Publication No. 50-51988 entitled "Method For Manufacturing Adsorbents for Water Treatment" of Ito et al., bacteria were reduced to a powder by drying in a vacuum at a temperature of 30° C. The dried bacteria were sprayed with water drops. The resultant particles were rotated on a plate to form one to two millimeter diameter particles. Ito et al. reported that these particles were sealed in a nitrogen gas atmosphere and heated at temperatures ranging from 215° C. to 250° C. for one hour to form water insoluble particles. If the bacterial particles were heated at less than 215° C., Ito et al. reported that the particles did not maintain their shape in water. Therefore, the bacterial particles that were heated at less than 215° C. were unsuitable for use in a column to extract metal ions from an aqueous solution.

Ito et al. investigated the metal ion binding capacity of insoluble particles, formed as described above, as a function of the heating temperature used in the formation process. Ito et al. reported that insoluble particles formed by heating at 215° C. adsorbed Hg to the extent of 3.8% of the dry weight of the particles while insoluble particles formed by heating at 250° C. adsorbed very little Hg. In another experiment, Ito et al. reported that insoluble particles formed by heating at 270° C. adsorbed cadmium from an aqueous solution, but the adsorption was less than the adsorption of particles formed by heating at 215° C. Thus, according to Ito et al., as the heating temperature used to form water insoluble particles increased, the metal ion adsorption of the particles decreased.

Several techniques have been investigated to increase the adsorption capability of immobilized microorganisms which had been heated in a nitrogen atmosphere, as described above. See for example, the Dec. 18, 1974, Japanese Laid-Open Patent Application entitled "Adsorbent for Water Treatment Using Microorganisms" of Ito et al., and the May 8, 1975 Japanese Laid-Open Patent Application No. 50-51481 entitled "Adsorbent for Water Treatment" of Ito et al. In one experiment, bacteria particles were coagulated in a nitrogen atmosphere at 212° C. for one hour. The resulting material was broken into 1 mm diameter particles and 5.5 grams of the 1 mm particles were placed in a glass tube. Ito et al. then flushed the tube with 10 mM hydrochloric acid at a flow of 300 ml/h until the pH of the effluent from the tube was about 2. The column containing the particles was then washed with 20 milliliters of water. Ten mM potassium hydroxide was flowed at 75 ml/hour through the column until the pH of the effluent became about 10. The column was again flushed with water.

The volume of the particles in the column expanded to 13 ml after the acid treatment and to 23 ml after the alkali treatment. Thus, although the particles are insoluble, the acid-alkali treatment resulted in significant swelling of the particles. This swelling is undesirable for applications in which the compositions are used in a closed chamber because the swelling is likely to result in either rupture of the chamber or blockage of flow through the chamber.

Ito et al. repeated the acid treatment process on the same insoluble particles several times. After each acid-alkali cycle, an aqueous solution containing 100 ppm of Cd derived from $CdCl_2$ was passed at 500 ml/h through the column until the concentration of the cadmium in the effluent was 10 ppm. The Cd adsorbed by the unprocessed composition was 0.91% of the dry weight of the particles. The Cd adsorption increased to 2.6% of the dry weight of the particles after six acid-alkali process cycles. Thus, the acid-alkali treatment increased not only the volume of the particles but also the Cd adsorption by about a factor of 3.

In yet another attempt to increase the adsorption of insoluble particles formed by heating in a nitrogen atmosphere at 215° C., Ito et al. soaked the insoluble particles overnight at room temperature in an aqueous potassium hydroxide solution having a pH of 12. The particles which precipitated from the potassium hydroxide aqueous solution were placed in a glass column and washed with water until the pH of the effluent from the column became about 7.4. In a control experiment, Ito et al. soaked another group of particles overnight in water. The Cd adsorption capability of particles was about 0.97% of the dry weight of the material for the water soaked particles the potassium hydroxide treated particles. Similar adsorption increases were seen for the adsorption of Pb and basic methyl violet after treating the particles with potassium hydroxide.

The increased adsorption capability obtained by the alkali treatment was attributed by Ito et al. to the enhanced porosity of the particles. The solubility of structural cell wall material is higher in an alkaline liquid than in a neutral or acidic liquid. Thus, according to Ito et al., the soaking of the insoluble particles in the alkaline solution resulted in solubilization, and consequently removal, of organic and inorganic substances with low molecular weights, i.e., structural cell wall material, from the composition which in turn enhanced the porosity of the composition.

While the above compositions were heated at temperatures as high as 270° C. in a nitrogen atmosphere to form water insoluble compositions, as the heating temperature used to form the compositions increased, the metal ion adsorption capability of the compositions decreased. These results suggest that particles containing immobilized metal ion-binding microorganisms which are heated at temperatures greater than 270° C. would probably not adsorb metal ions from an aqueous solution effectively. These results are supported by the process used to form active carbon. As described above, charcoal which is formed by heating biological material at 400°–800° C. in an inert atmosphere, has relatively poor adsorption capability. To obtain a material with effective adsorption capability, the charcoal is further processed at 850° C.–1100° C. to form active carbon. However, as previously discussed, active carbon is not useful for adsorption of metal ions from an aqueous solution having a temperature of 80° C. or greater. Accordingly, based upon the above experience with biological materials, heating of immobilized microorganisms at temperatures in the range of about 250° C. to 800° C. would not be expected to form compositions suitable for extraction of metal ions from an aqueous solution at either ambient or elevated temperatures.

SUMMARY OF THE INVENTION

The compositions of this invention are formed by heating immobilized metal ion-binding microorganisms in an oven at elevated temperatures for a selected period of time. Contrary to prior art compositions, the resulting compositions have the unexpected capability to effectively adsorb metal ions from aqueous solutions both at ambient temperatures and at temperatures significantly greater than ambient Further, the compositions do not swell when immersed in an acidic solution and then subsequently immersed in an alkaline solution. Therefore, the compositions of this invention, unlike the prior art compositions formed by heating at temperatures less than 270° C., can be used in closed containers and immersed in acidic solutions or alkaline solutions in any desired sequence.

According to the principles of this invention, compositions containing metal ion-binding material are formed by:
1. Immobilizing metal ion-binding microorganisms or metal ion-binding material (microorganisms/material);
2. Washing the immobilized microorganisms/material;
3. Drying the washed immobilized microorganisms/material; and
4. Heating the dried immobilized microorganisms/material at an elevated temperature for a selected period of time.

The immobilization step constrains the microorganisms/material within a composition. The washing of the immobilized microorganisms removes excess material from the immobilization step but does not affect the volume of the beads. The drying step kills any living microorganisms/material and reduces the volume of the immobilized metal ion-binding microorganisms/material. The heating of the dried immobilized microorganisms/material at an elevated temperature is essential because compositions which are not heated at the elevated temperature rapidly disintegrate when exposed to aqueous solutions at elevated temperatures.

In one embodiment, a composition is formed by first combining the powder of an alga (a metal ion-binding microorganism) and an alkaline solution; for example sodium hydroxide, to form a mixture. Optionally another metal ion-binding microorganism is slowly added to the mixture to form a slurry. Either the mixture or the slurry is added to a metal ion-containing solution to form an insoluble material, preferably formed as beads, containing immobilized metal ion-binding microorganisms. The valence of the metal ion in the metal ion-containing solution is two or greater. The beads are removed from the metal-containing solution, washed with water, and dried prior to the exposure at an elevated temperature for a selected period of time.

Insoluble compositions containing metal ion-binding microorganisms have been formed using several different embodiments of the immobilization step. For example, mixing a brown alga with sodium hydroxide and contacting the resulting mixture with a selected solution formed an insoluble composition. Also, mixing a red alga with sodium hydroxide and contacting the resulting mixture with a selected solution formed another insoluble composition. Further, metal ion-binding microorganisms were immobilized by contacting an aqueous mixture including a powdered alkaline treated red alga with an acid to form an insoluble composition. Each of the insoluble compositions was subsequently washed, dried and heated at an elevated temperature to form one of the compositions of this invention.

To recover metal ions from an aqueous medium containing one or more metal ions, a composition of this invention is immersed in the aqueous medium for a period of time sufficient to permit binding of one of the metal ions in the aqueous medium to the immobilized microorganisms in the composition. The composition is suitable for extracting metal ions from aqueous solutions over a broad range of temperatures and pressures because, unlike the prior art alga-silica compositions which contained immobilized microorganisms, the compositions of this invention are stable and maintain their integrity at high temperatures and high pressures. The compositions of this invention can be used in aqueous solutions having temperatures ranging from about 20° C. to about 300° C. or possibly even higher. Moreover, the compositions of this invention are also suitable for repeated use in recovery of metal ions at alkaline pHs or in procedures that require an alkaline solution to strip the bound metals from the composition because the compositions neither swell nor hydrolyze.

After the composition is contacted at a high temperature with an aqueous solution containing precious metal ions and the precious metal ions have bound to the composition, the bound metal ions are recovered by contacting the composition with an eluting agent. Similarly, if the composition is used at ambient temperatures to remove metal ions from an aqueous solution, the bound metal ions are stripped by using an eluent.

In one embodiment, the composition is washed with an alkaline solution to improve the metal ion-binding capability of the composition.

In addition to the ability to extract metal ions from an aqueous solution over a broad range of temperatures, the compositions of this invention preferentially adsorb precious metal ions from a solution containing other dissolved materials having a concentration significantly greater than the concentration of precious metal ions. Precious metal ions bound to the compositions of this invention can be selectively stripped from the compositions so as to recover each precious metal ion species individually. Finally, through pH control of an aqueous solution containing base metal ions, base metal ions are selectively extracted by the compositions of this invention from the aqueous solution. The bound base metal ions are selectively removed from the compositions of this invention through the use of pH gradients.

Unlike the prior art compositions which hydrolyzed at high temperatures and in alkaline solutions, the compositions of this invention are effective for recovery of metal ions in an aqueous medium over a broad range of temperatures, pressures, alkaline pHs and acidic pHs, and are stable over long periods of use.

DETAILED DESCRIPTION

Figure 1A:
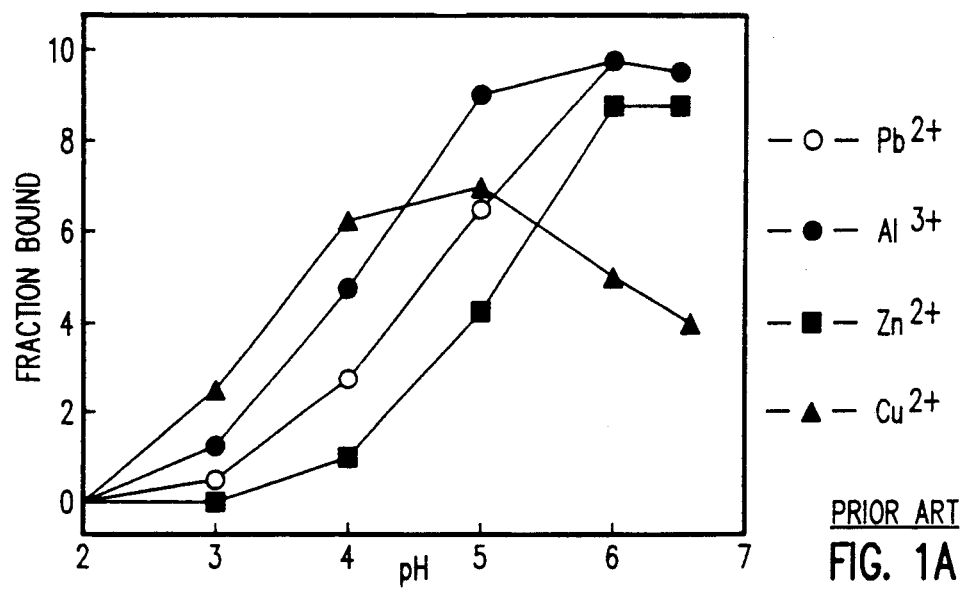
FIGS. 1A, 1B and 1C illustrate the prior art pH dependence of metal ion sorption by *Chlorella vulgaris*.
Figure 1B:
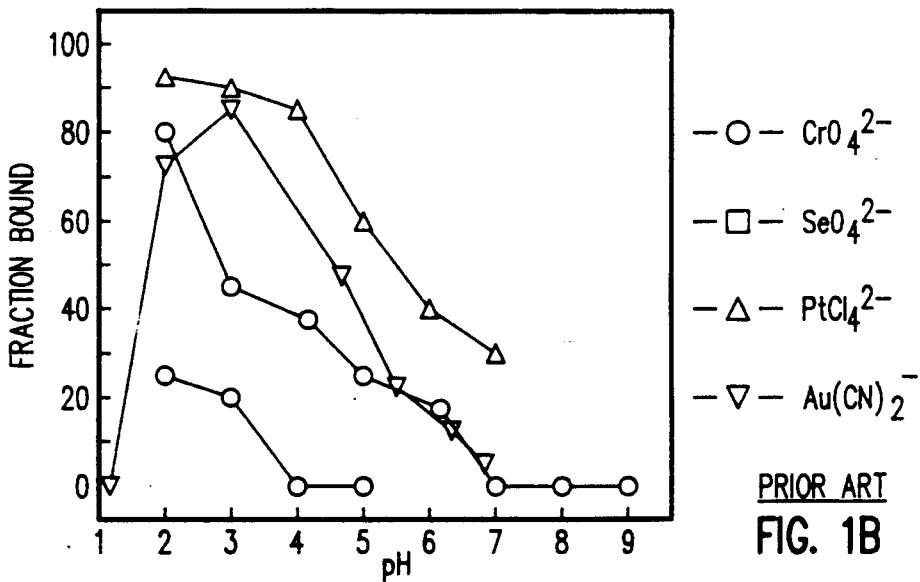
Figure 1C:
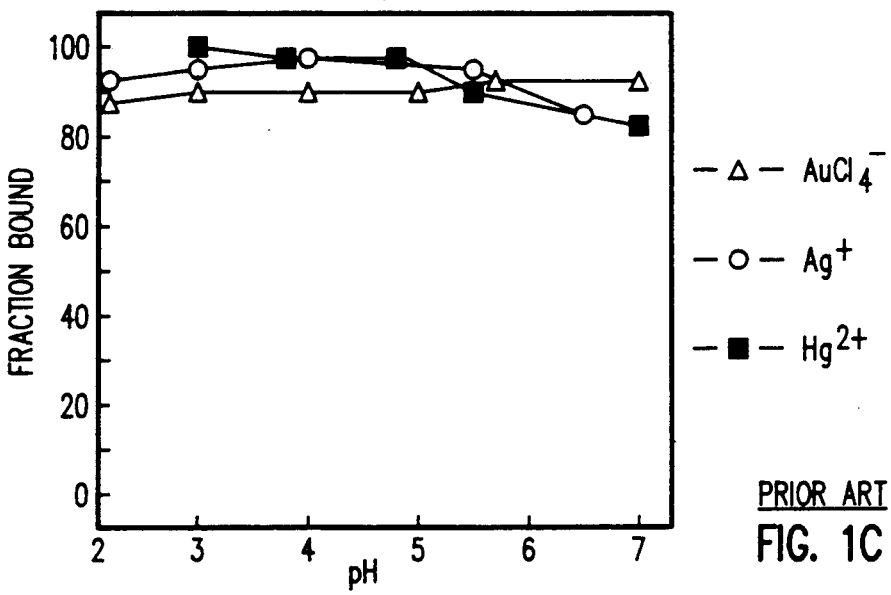

Compositions made using the principles of this invention contain one or more species of immobilized microorganisms capable of binding metal ions. Unlike the prior art compositions containing immobilized microorganisms, the compositions of this invention are stable and non-swelling in aqueous solutions with temperatures as high as 300° C. or possibly higher and in aqueous solutions having pHs in the range of less than zero to greater than 12. Further, the compositions, which are formed by heating at a temperature greater than 270° C., have the unexpected capability to effectively adsorb metal ions from an aqueous solution.

The compositions of this invention are formed by immobilizing microorganisms or other material capable of binding metal ions; washing the immobilized metal ion-binding microorganisms; drying the washed immobilized metal ion-binding microorganisms; and heating the dried immobilized metal ion-binding microorganisms at an elevated temperature As used herein, an elevated temperature refers to a temperature in the range of about 300° C. to about 500° C. The heating of the dried immobilized microorganisms is an essential feature of this invention because dried immobilized microorganisms which have not been heated rapidly disintegrate when exposed to high temperature aqueous solutions.

The compositions formed using the process of this invention are not only stable in high temperature aqueous solutions and over a broad range of pHs, but also the compositions do not swell when immersed in alternating alkaline solutions and acidic solutions. Moreover, the exposure of the compositions of this invention to an acidic solution from which metal ions are extracted and then to an alkaline solution which first strips the bound metal ions and subsequently continues to wash the composition enhances the binding capacity of the composition on subsequent cycles.

The immobilized microorganisms in the compositions of this invention preferentially adsorb precious metal ions such as gold, silver and platinum from an aqueous solution containing concentrations of base metal ions and/or other dissolved materials ranging from several orders of magnitude greater than the concentration of the precious metal ions to orders of magnitude less than the concentration of precious metal ions. As used herein, the term "precious metals" refers to metal ions such as platinum, rhodium, palladium, ruthenium, iridium, gold and silver. The term "base metals" refers to metal ions such as aluminum, copper, cobalt, chromium, iron, manganese, lead, nickel and zinc ions. The terms "hard metal ions," "intermediate metal ions," and "soft metal ions" refer respectively to the groups of metal ions as defined above, which are incorporated herein by reference.

In addition to the recovery of precious metal ions from an aqueous solution, the compositions of this invention have been used to extract hard metal ions, intermediate metal ions, and soft metal ions from aqueous solutions at ambient temperatures.

The compositions of this invention, which have been prepared as described below, have been used to extract precious metal ions from geothermal fluids. The compositions maintained their integrity and metal binding capability in the dynamic high temperature, high pressure geothermal flow unlike the prior art silica-algae compositions, which would rapidly disintegrate under such conditions. In fact, the compositions of the invention are useful for extraction and recovery of metal ions from aqueous solutions having temperatures from about 20° C. to about 300° C. or higher, pressures from about 14 psi to over 500 psi, and pH values from below 0 to about 14.

Several procedures have been developed for producing the compositions containing metal ion-binding material of this invention, but each of the procedures include four basic steps. The four steps, described more completely below, are:

1. Immobilizing metal ion-binding microorganisms or metal ion-binding material (microorganisms/material);
2. Washing the immobilized microorganisms/material;
3. Drying the washed immobilized microorganisms/material; and
4. Heating the dried immobilized microorganisms/material at an elevated temperature for a selected period of time.

The resulting compositions are believed to contain up to 80–95% by weight of immobilized metal ion-binding microorganisms/material. The variation in the procedures of this invention is associated primarily with the first step, i.e., the method of immobilization.

In one embodiment of the immobilization step, a metal binding material, for example algal cells, bacteria, yeast or fungi, is mixed in sodium alginate, which is alkali treated alginic acid, to form a slurry. The slurry is selectively added, as described below, to a solution containing calcium. Upon contact of the slurry with the calcium solution, the divalent calcium cations form ionic bridges between negative charges on the alginate polymers resulting in the formation of spherical insoluble metallic (calcium) alginate beads.

The spherical beads formed by selective addition of the slurry to the calcium containing solution are a preferred embodiment because spherical beads are easily packed in a chamber or chromatographic column. However, the compositions of this invention can be formed by contacting the slurry in any manner with a calcium containing solution and subsequently forming particles from the insoluble material created.

While in this embodiment calcium containing solutions have been used to demonstrate the principles of this invention, other metal containing solutions, where the metal in the solution has a valence greater than or equal to two, can be used to form the insoluble metallic-alginate beads. For example, solutions containing aluminum, cerium or any one of the lanthanide metals should be suitable for use in the step of forming insoluble metallic-alginate beads containing immobilized metal ion-binding microorganisms. In particular, a solution of 3% aluminum chloride hexa-hydrate ($AlCl_3.6H_2O$) has been successfully used to form the composition of this invention.

The method for forming the alginate beads of this invention is similar to the prior art methods used to immobilize living algal cells in alginate, as described previously. However, the formation of the alginate beads is only the first step in forming the composition of this invention. The subsequent steps, described more completely below, used to process the insoluble beads are essential for making a composition suitable for recovery of metal ions in both ambient and high temperature solutions because experiments, described below, have shown that insoluble beads which are not processed according to the subsequent steps rapidly disintegrate when immersed in high temperature (about 190° C.) aqueous solutions.

The insoluble metallic-alginate bead compositions of this invention have been successfully made using (i) a sodium alginate solution consisting of purified alginic acid and sodium hydroxide, and for example, (ii) ground, powdered cells of one of *Laminaria japonica, Laminaria longicrurus, Eisenia bicyclis* and *Alaria esculenta* combined with sodium hydroxide. Purified alginic acid is isolated from algae, particularly the brown algae, such as Laminaria sp., Macrocystis sp. or other kelps using commercially known techniques. Alginic acid suitable for use with this invention can be purchased commercially from a company such as Sigma Chemical of St. Louis, Missouri or Aldrich Chemical Co. of Milwaukee, Wisconsin.

The *Laminaria japonica* powder was purchased from Nitto Chemical Industry Company, Ltd. of Tokyo, Japan. To make the Laminaria powder, Laminaria was harvested and cut into flakes approximately two inches square. The flakes were placed in boiling water. The water soluble components of the flakes were removed from the flakes by the boiling water. After a period of time, the boiling water was filtered to remove the Laminaria residue. The residue was dried and ground. Typically, at least 60% of the particles in the ground Laminaria powder have a diameter of 150 microns or less.

*Laminaria longicrurus, Eisenia bicyclis* and *Alaria esculenta* were each ground to a powder using a mill which was designed for grinding wheat to make flour. These algae were not subjected to a boiling water extraction prior to the grinding. The formation of insoluble metallic gel beads using powered brown algal cells indicates that other brown algae that occupy the algal division, Phaeophycophyta, which include Macrocystis sp., Ectocarpus sp., Padina sp., Pictyota sp., Postelsia sp., Pelaqophysus sp., and Neriocystis sp. can be used also in this immobilization method to form insoluble metallic gel beads. As used herein, an algal or other genus, Laminaria sp. for example, should be interpreted as referring to and including each of the species within that genus.

In addition to the brown algae that contain alginic acid, bacteria, such as Azotobacter and pseudomonas, are also known to contain alginate. Thus, adding bacteria containing alginate to sodium hydroxide should also produce a sodium alginate mixture. Upon contacting the bacteria based sodium alginate mixture with a calcium containing solution, insoluble beads containing immobilized bacteria would be formed.

As described above, in one embodiment of the immobilization step of this invention, Laminaria powder or the powder of another brown alga was added to sodium hydroxide to form a mixture. The Laminaria-sodium hydroxide mixture was selectively added to a calcium containing solution to form beads containing only Laminaria. This method is described in more detail in Example 3.

In another embodiment of the immobilization step, other metal ion-binding microorganisms were mixed with the Laminaria-sodium hydroxide mixture and the resulting slurry added to a calcium containing solution to form beads having immobilized Laminaria, and the other metal ion-binding microorganisms. Examples of this immobilization step include mixing one of the algae Spirulina, a blue-green alga, Chlorella, a green alga, or Cyanidium, classified as either a green or a red alga, or *Saccharomyces cerevisiae* (Baker's yeast) into the Laminaria-sodium hydroxide mixture.

Each of the brown algae are known to contain alginic acid. However, in the immobilization step of this invention, insoluble metallic gel beads have also been successfully formed by selectively contacting a sodium hydroxide and red alga slurry with a calcium containing solution The red algae contain primarily carrageenan rather than alginic acid. In the subsequent description, the phrase "alginate beads" refers to beads made from purified alginic acid while the phrases of the form "beads modified by the name of an alga," or "beads modified by the name of an alga in conjunction with another microorganism," refer to beads made using an alga or another microorganism containing acidic carbohydrate polymers, for example carrageenan or alginic acid, instead of purified alginic acid.

Bacteria, such as Acetobacter, Agrobacterium and Alcaligenes, and plants, such as cotton, jute and flax, are known to contain carrageenan. Accordingly, following the principles of this invention as presented in the Examples below, bacteria and plant material can probably be used to form the compositions of this invention in a manner similar to red alga.

In each of the immobilization steps described above, insoluble metallic gel beads were formed by mixing either purified alginic acid or microorganisms containing acidic carbohydrate polymers and an alkaline solution, NaOH, and then selectively contacting the resulting mixture with divalent, trivalent, or possibly tetravalent cations in a solution.

However, in an alternative embodiment of the immobilization step of this invention, metal ion-binding microorganisms were immobilized by selectively adding an algal mixture consisting of a homogeneous aqueous mixture of a red alga and a blue-green alga, for example, to an acidic solution Specifically, *Euchema spinosum*, a red alga, was washed with sodium hydroxide and dried. The dried alga was then ground to a powder (called a Euchema powder). The alkaline treated Euchema powder and the powder of a blue-green alga, *Spirulina platensis*, were added to distilled water and a homogeneous slurry formed. The slurry was added to 0.5 M hydrochloric acid. Upon contact of the slurry with the hydrochloric acid, insoluble beads formed which rapidly dropped to the bottom of the hydrochloric acid solution. The insoluble beads were recovered from the bottom of the solution and processed according to the subsequent steps of this invention. Hence, in this embodiment of the immobilization step metal ion-binding microorganisms were immobilized without the use of either NaOH or a metal containing solution wherein the metal in solution had a valence greater than or equal to two.

In another embodiment, metal ion-binding microorganisms were immobilized by selectively adding a homogeneous mixture of a red alga and sodium hydroxide to an acid at a pH of from about 4 to 1. In each of the above immobilization steps that used a red alga, the red alga may be selected from the algal division Rhodophycophyta.

In view of the above discussion, metal ion-binding microorganisms can be immobilized in an insoluble material in many ways. In the following description the phrase "the first mixture" refers to both the sodium-alginate mixture and the algal mixtures. Similarly, the phrase "selected solution" refers to the solution required to form insoluble beads when "the first mixture"

is contacted with the "selected solution" according to the principles of this invention. A slurry is formed when one or more metal ion-binding microorganisms are added to the first mixture and the resulting composition is mixed until the composition becomes homogeneous.

After the beads containing immobilized metal ion-binding microorganisms are formed by one of the above immobilization steps, the beads are recovered from the selected solution, washed, and dried for several hours at 110° C. The drying sterilizes the beads and kills any living algal cells or other metal ion-binding microorganisms. As the beads are dried, the beads decrease in volume by a factor of from about 3 to about 10.

To form the composition of this invention, the dried beads are packed in a crucible, covered, and heated at an elevated temperature in the range of about 300°–500° C. This step produces a charred non-swelling composition that adsorbs metal ions in an aqueous solution at temperatures ranging from about 22° C. to about 300° C. or possibly higher. As described below, dried beads which are not heated at an elevated temperature rapidly disintegrate when exposed to an aqueous solution having a temperature of about 190° C.

As used herein, the phrase "elevated temperature" means a high temperature, greater than about 300° C., in comparison to normal ambient room temperature of about 22° C. In a preferred embodiment, the beads are heated at an elevated temperature of about 400° C. for about four hours. The resulting composition has metal binding capability at temperatures up to about 300° C. or higher and in solutions having a pH from below 0 to about 14 as well as enhanced metal ion binding capability at ambient temperatures in comparison to prior art compositions containing immobilized algae.

To demonstrate the importance of heating the composition at an elevated temperature, beads containing immobilized Chlorella alga and beads containing immobilized Cyanidium alga were prepared as described in Example 1 below, except the final heating step at 400° C. was eliminated from the method of preparation. After exposure to geothermal temperature and pressure, both sets of these beads were very badly decomposed. However, other beads which were prepared as described in Example 1 maintained their integrity after exposure to geothermal conditions and could be reused.

Another advantage of the compositions of this invention is that the metal ion-binding capability of the compositions can be used to remove toxic metals from ground waters with a greater efficiency than heretofore known, without at the same time generating additional toxic waste. The compositions of this invention remove toxic metal ions even in ground water containing calcium and magnesium, two materials, which when present in ground water have, in the past, inhibited the use of commercial ion exchange resins for removal of toxic metals.

The metal ion-binding capabilities of the compositions formed using the principles of this invention are determined by the alga or algae used to form the first mixture and the metal ion-binding materials added to the first mixture to form a homogeneous slurry. Therefore, since algae or other metal ion binding microorganisms are known to preferentially bind certain metal ions, compositions of this invention can be made to selectively remove one or more metal ions from an aqueous solution by selectively choosing the alga used to form the first mixture and the metal ion-binding materials added to the first mixture to form a homogeneous slurry.

Any material capable of binding metal ions may be immobilized by adding the material to the first mixture, as defined above, if a homogeneous slurry can be formed. For example, blue-green, green, brown, euglenoids, stonewarts, golden, dinoflagellates, and red algae, and other microorganisms including bacteria, fungi, yeast or other plant or animal materials can be added to the first mixture.

As an example of using a metal binding microorganism other than an alga, *Saccharomyces cerevisiae* (Baker's yeast) was added to a first mixture of *Laminaria japonica* powder and sodium hydroxide. The *Laminaria-Saccharomyces* slurry was selectively added to a 3% calcium chloride solution to form insoluble metallic gel beads. According to the principles of this invention, as previously described, the beads were removed from the calcium chloride solution, rinsed in deionized water and dried for about 18 hours at about 125° C. The dried beads were then heated for about four hours at about 400° C. to form one of the compositions of this invention. The physical characteristics of the composition containing the yeast were similar to the physical characteristics of other compositions formed according to the principles of this invention.

The method for selecting the quantity of metal ion-binding material added to the selected mixture and the method for selecting the heating time for the dried beads as well as the metal ion-binding characteristics of the resulting composition will be apparent to those skilled in the art in view of the Examples given below.

Previous studies have demonstrated that at a fixed pH different algal species preferentially bind soft ions, intermediate ions or hard ions. In prior studies, gold(III) was selected as a representative soft metal ion, copper(II) as an intermediate metal ion, and aluminum(III) as a hard metal ion. *Chlorella pyrenoidosa* bound gold(III) most strongly while *Eisenia bicyclis* bound aluminum(III) most strongly and *Cyanidium caldarium* bound copper(II) most strongly at a fixed pH. Thus, by incorporating one or more metal-binding materials in the compositions of this invention a custom composition may be formed which selectively removes one or more metals from an aqueous solution without adjustment of the pH level of the aqueous solution. For example, if *Chlorella pyrenoidosa* and *Cyanidium caldarium* are immobilized according to the principles of this invention, the resulting composition would preferentially adsorb soft and intermediate metal ions from an aqueous solution at a fixed pH in which the composition was placed. The bound metal ions would then be selectively recovered by sequentially using an eluting agent that stripped the bound intermediate metal ions and then an eluting agent that stripped the bound soft metal ions.

In addition to the dynamic geothermal recovery processes, described below, static experiments have demonstrated the ability of the compositions of this invention to maintain their integrity at high temperatures and high pressures. For these experiments, beads of *Laminaria-Chlorella* were formed, as previously described, washed, dried, and heated to about 400° C. for four hours. About 0.1–0.2 grams of these beads, with an average diameter of 3–4 millimeters (mm), were placed in a teflon-lined bomb, described more completely in Example 10.

After the beads and five milliliters of distilled water were placed in the bomb assembly, the bomb assembly was sealed and placed in a muffle furnace so that the beads were in contact with the distilled water. The bomb was heated for eight to ten hours at about 190° C. After this time, the bomb was removed from the muffle furnace and allowed to cool Examination of the beads revealed that the beads maintained their structure and material from the beads did not leach into the water.

To determine the effect of extended high temperature operation, the experiment was repeated with a new batch of beads in five milliliters of distilled water placed in the bomb assembly. The bomb assembly was heated in the muffle furnace at about 190° C. for one week. At the end of the week, after the bomb was allowed to cool, the bomb was opened and the contents were found to be intact, but the liquid was colored indicating that some material had leached from the beads.

The beads were resealed in the bomb and the bomb was heated at 190° C. for another week. At the end of the second week, the contents of the bomb were examined, and found to be in substantially the same condition as after the first week. Thus, the beads maintained their integrity and were not significantly affected by the two week high temperature exposure, unlike the prior art compositions of Kobayashi that were formed by heating at 120° C. to 160° C. for about two hours and which showed some degradation after being placed in 60° C. water for only three hours.

After the two week high-temperature exposure, the Laminaria-Chlorella beads crush and smear under slight finger pressure. Finger pressure testing was used as a qualitative test for the ability of the beads of this invention to withstand high temperatures and high pressures for an extended period of time. As an example of the reason for this test, consider a geothermal flow field which has a pressure of approximately 265 psi and beads which have an average diameter of 2 mm. Such beads must withstand very roughly a static compression force of about five pounds from the 265 psi pressure. Accordingly, beads that crush and smear easily are not likely to withstand this force for an extended period of time, while beads that require slight finger pressure or greater, e.g., (a compression force of three-five pounds or greater) should perform satisfactorily in geothermal flow fields.

After the two-week high-temperature test, about one hundred milligrams of approximately four millimeter diameter beads were placed in the bomb with five milliliters of water extracted from a geothermal source containing dissolved materials. After three weeks of exposure to 190° C., the bomb was opened and the contents inspected. The water was not discolored, which indicated that no significant material had leached from the beads into the water during the extended exposure to the high temperature, high pressure conditions and the exposure to the dissolved materials in the water had no affect on the beads.

The ability of the composition of this invention to maintain its integrity at 190° C. for an extended period of time is a significant advancement over the prior art. The prior art silica-polymer compositions for extracting metal ions from aqueous solutions hydrolyzed and disintegrated at such temperatures within an hour.

The geothermal tests, described below, provided a dynamic demonstration of the capability of the compositions of this invention to extract metal ions from a high temperature aqueous solution. However, as described more completely below, the metal content of the geothermal fluid is a function of many variables, and so the performance of the compositions of this invention would be difficult to accurately quantify using only geothermal results. Accordingly, several static experiments were performed to ascertain the performance characteristics of the compositions of this invention.

In a first test, the Laminaria-Chlorella beads of this invention were subjected for 15-20 hours to 190° C. filtered geothermal water spiked to 100 ppb of gold using $HAuCl_4$. The geothermal water originally contained approximately 3,000 ppm of dissolved material and the filtering probably did not substantially alter the dissolved material content of the geothermal waters.

After the high temperature exposure, the spiked geothermal water was analyzed for the presence of gold using a graphite furnace atomic absorption spectrometer. No significant amount of gold was detected. The graphite furnace atomic absorption measurement can detect about two ppb or more of gold in the geothermal water matrix. Consequently, the failure to detect a significant amount of gold indicates that substantially all the gold in the aqueous solution with a high total dissolved mineral content was extracted by the beads of this invention containing immobilized microorganisms.

To demonstrate that the gold was extracted by the beads and had not plated out on the surfaces of the bomb, a new gold spiked solution was placed in a bomb and heated for the same period of time. After the bomb cooled, the solution was analyzed. The analysis showed that all the gold was still contained in the solution. Therefore, plating of gold onto the teflon surfaces of the bomb was not a mechanism for extraction of gold from the aqueous solution.

To recover the gold bound to the microorganisms immobilized in the beads, an aqua regia digest was performed. An average of about thirteen parts per billion of gold was recovered from the digest. Hence, about 85% of the gold remained bound to the beads despite the aqua regia digest. As used herein "digest," "extraction" or a similar expression referring to stripping metal ions from immobilized metal ion-binding microorganisms means contacting the compositions of this invention having bound metal ions with an eluting agent under conditions such that the bound metal ions are stripped from the compositions.

The resin remaining after the aqua regia digest was placed in a tube with 5 milliliters of 0.2% sodium cyanide (NaCN). Historically, sodium cyanide has been used to leach gold from ores. The tube was swept with oxygen and sealed. The sealed tube was rocked overnight (18 hours) at room temperature. The average recovery for the aqua regia digest and the subsequent treatment with NaCN was 82.5 ppb of gold. Since evaporation caused some loss of water, calculations accounting for volume losses showed a 62% average recovery of the gold bound to the beads.

As a feature of this invention, the compositions are reusable Specifically, after the bound metal is recovered from the compositions, the compositions are again placed in an aqueous solution containing dissolved metal ions. Although only a certain percentage of the bound metal may be recovered from the composition the first time the composition is used, subsequent use of the beads to recover the same metal from the same type of solution may result in close to 100% of the bound metal being recovered. Further experiments are required to show whether, or not this is the case.

Several additional gold binding experiments were performed to obtain compositions, beads formed according to the steps described above, with bound gold for use in studying alternate methods for recovery of the bound gold from the beads. In all the binding experiments, the beads of this invention, containing immobilized microorganisms, were initially exposed at a temperature of about 190° C. to an aqueous solution containing 100 ppb of gold.

The extraction of the gold from the aqueous solution ranged from 80-100%, as determined by graphite furnace atomic absorption measurements. All the gold was assumed to be extracted from the solution when the graphite furnace atomic absorption measurement failed to detect the presence of gold. The variation in the measured extraction of the gold from the aqueous solution is attributed to experimental error. Since the beads removed almost all of the gold from the solution, the remaining solution contained gold at a very low level, i.e., on the order of 1-10 ppb. Considering the experimental error associated with graphite furnace atomic absorption measurements at these low levels, the results of the binding experiments can be effectively interpreted as 100% removal of the gold from the aqueous solution.

Several different methods, described in more detail in Example 10 below, were used to recover gold bound to the microorganisms in the beads. The recovery ranged from 27% to about 79% of the bound gold. To obtain the best recovery, after the *Laminaria-Chlorella* beads were exposed to the high temperature gold-spiked solution, the beads were dried for two hours at 100° C. and then sealed in tubes with 5 ml of 0.5% sodium cyanide and rocked at 85° C. for five hours. Drying the beads before extraction did not affect the ability of sodium cyanide to remove the gold from the beads.

The recovery of 80% of the gold from a high temperature aqueous solution is a significant advancement over the prior art methods which functioned only for low temperature solutions in comparison to the 190° C. temperature. In fact, this is the first demonstration, to the best knowledge of the inventors, of recovery of precious metals from an aqueous solution at elevated temperatures and is made possible by the compositions of this invention which remain intact at elevated temperatures.

To demonstrate recovery of other precious metals from high temperature, high pressure aqueous solutions, compositions formed using the principles of this invention were used to recover silver from a high temperature aqueous solution containing silver ions and to recover platinum from another high temperature aqueous solution containing platinum ions. Specifically, 0.100 grams of Laminaria-Chlorella beads were exposed to a five milliliter solution containing 2.54 parts per million silver (derived from silver nitrate) at 190° C. for about 18 hours. After the exposure, subsequent analysis of the aqueous solution using the graphite furnace atomic absorption spectrometer showed that only 0.07 parts per million of silver remained in the solution Therefore, 97% of the silver was bound to the beads at the elevated temperature.

To recover the bound silver from the beads, the beads were placed in a tube with NaCN, oxygen was passed over them and then the tube was sealed. The beads were digested overnight with the 0.5% sodium cyanide at about 85-90° C. as described below. The recovery of silver was effectively 100%.

In the prior analysis, silver in an aqueous solution was contacted with the beads of this invention, but the fluid from a geothermal well contains precious metals and other dissolved materials, as previously described. To simulate a geothermal fluid, five milliliters of an aqueous solution saturated with sodium chloride at room temperature (about 250,000 ppm NaCl) was spiked to 2.54 ppm silver (derived from silver nitrate). After exposure of the Laminaria-Chlorella beads of this invention at high temperatures, 190° C., to the sodium chloride solution spiked with silver, the solution remaining in the bomb could not be analyzed for silver content because of the high concentration of sodium chloride.

The beads containing the bound silver were digested overnight with 0.5% sodium cyanide at about 85-90° C. Analysis of the extracts from the digestion showed that about 2.0 parts per million of silver had been recovered. Accordingly, the recovery, and thus the binding in the presence of the high sodium chloride content, was at least 80% effective.

Tests similar to those for the binding of gold and silver at elevated temperatures and pressures were conducted for platinum. Distilled water (5 ml) spiked to a level of 50 ppb of platinum with $PtCl_4$ was placed in the bomb with 0.100 grams of Laminaria-Chlorella beads of this invention. Again, the bomb was placed in the oven and heated for about 18 hours at about 190° C. Analysis of the solution in the bomb after the test indicated that no platinum remained in the test solution so that complete binding had occurred with the Laminaria-Chlorella immobilized in the beads of this invention.

To recover the bound platinum, beads were extracted with 5 milliliters of 0.5% sodium cyanide, which was swept with oxygen, for about 18 hours at about 85-90° C. This extraction recovered about 25% of the bound platinum. Hence, the beads were re-extracted using another portion of 0.5% sodium cyanide at about 190° C. for about 18 hours in the bomb. The second extraction was ineffective in recovering any additional platinum.

Additional binding tests were made and several methods tried for extracting bound platinum from the Laminaria-Chlorella beads. Extraction using 5 milliliters of 0.1 M thiourea at about a pH of 2 and a temperature of about 85° C. to 90° C. was ineffective in recovering platinum. However, a boiling aqua regia digestion of beads containing bound platinum for about 3.5 hours produced recovery of platinum which ranged from 63% to 100%.

While the aqua regia provided a better recovery than the sodium cyanide procedure, the aqua regia was used only because it provides good analytical results. In actual practice, the aqua regia recovery process may be too expensive to be utilized on a production scale. Burning of the beads, which is far less expensive than the aqua regia digest, is an alternative means for recovery of the bound platinum.

The extracts obtained using the boiling aqua regia were analyzed using a graphite furnace atomic absorption spectrometer. However, a high background, created by materials that are solubilized by the aqua regia digest, introduced a large level of uncertainty in the recovery measurements. Nevertheless, the beads were not visibly affected in volume, shape, or appearance by the aqua regia digest.

Platinum may also be contained in a geothermal field that contains a high level of other dissolved materials. To simulate the ability of the *Laminaria-Chlorella* beads to bind platinum in the presence of a high level of other dissolved materials, the beads were placed in a saturated sodium chloride solution (approximately 25% salt solution which is about 250,000 ppm) which was spiked to 100 ppb of platinum with $PtCl_4$. The bomb binding test was repeated. Again the high sodium chloride concentrations prevented determination of the platinum content in the solution after the bomb test. However, aqua regia digestion of the beads resulted in a recovery of at least 21% of the platinum. In this process, the percent recovery was determined by comparison of the amount of the metal recovered from the beads and the amount of metal in the original aqueous solution While this approach does not precisely define the percentage of metal bound to the beads, the approach does define the lower limit for the percentage of the metal bound to the beads.

Geothermal fields may contain very low concentrations of gold and other precious metals, in either the parts per million (ppm) range or the parts per billion (ppb) range, and the temperatures of the fluids at the wellhead may be up to 300° C. or higher and the pressures may be up to 500 psi or higher. In addition to the low concentrations of precious metals, the geothermal fluids may have a total dissolved solid content of materials other than precious metals as high as 250,000 parts per million (ppm).

The solubility of any particular solid in water, such as a geothermal fluid, is a function of the water temperature and other minerals contained in the water. For example, the solubility of precious metals, such as platinum or silver, is affected by the enthalpy of complexation and the solubility is increased at a given temperature by the presence in the water of certain salts such as sodium chloride, sodium bromide, sodium iodide, potassium chloride, potassium bromide, potassium iodide, and other chlorides, bromides, iodides or pseudohalides. Other compounds in the water, which affect the solubility of minerals in the water, include hydrogen sulfide and sulfide salts. These minerals typically occur naturally in the water. The solubility of metal ions in water can be changed by artificially adding materials to the water such as cyanide salts, thiourea or other compounds typically known to extract precious metals from ores.

Recovery of gold or other precious metals from geothermal fluids is further complicated by the observation that precious metals plate out on piping used to extract the geothermal fluid from the ground. Consequently, recovery of the precious metals from geothermal sources requires that any composition used in the recovery be placed as close to the wellhead as possible. Almost certainly, the prior art compositions containing immobilized algae, bacteria or fungi would rapidly disintegrate when placed in a solution having the 150° C. or higher temperatures and the associated pressure encountered at a geothermal wellhead. Therefore, prior art compositions, which adsorb metal ions at ambient temperatures, are probably not suitable for extraction of precious metals from geothermal fluids.

The compositions of this invention have been used to extract precious metals from geothermal fluids at elevated temperatures as high as about 300° C. and pressures as high as about 500 psi. Moreover, the precious metals extracted by the composition were recovered using methods described below.

Extraction, as used herein, means the removal of metal ions from a medium. Accordingly, the dissolved metal ions in an aqueous solution are extracted from the aqueous solution by the binding of the metal ions to the compositions of this invention. Similarly, recovery of metal ions means extraction of the metal ions from the composition to which the metal ions are bound, i.e., removal of bound metal ions from the composition.

The extraction of precious metal ions from geothermal fluids at about wellhead pressures and temperatures is an important aspect of this invention. If the geothermal fluids are cooled and brought to atmospheric pressure, the dissolved materials including precious metals in the fluid precipitate in massive quantities as a sludge. While it may be possible to extract precious metals from the sludge, the remaining base metals in the sludge present a serious disposal problem. However, using the compositions of this invention to preferentially extract precious metal ions from the geothermal fluid at elevated temperatures and pressures while leaving substantially unextracted non-precious metals permits reinjecting the geothermal fluid into the ground. Hence, the precious metals are recovered without creating an associated disposal problem.

Figure 2A:
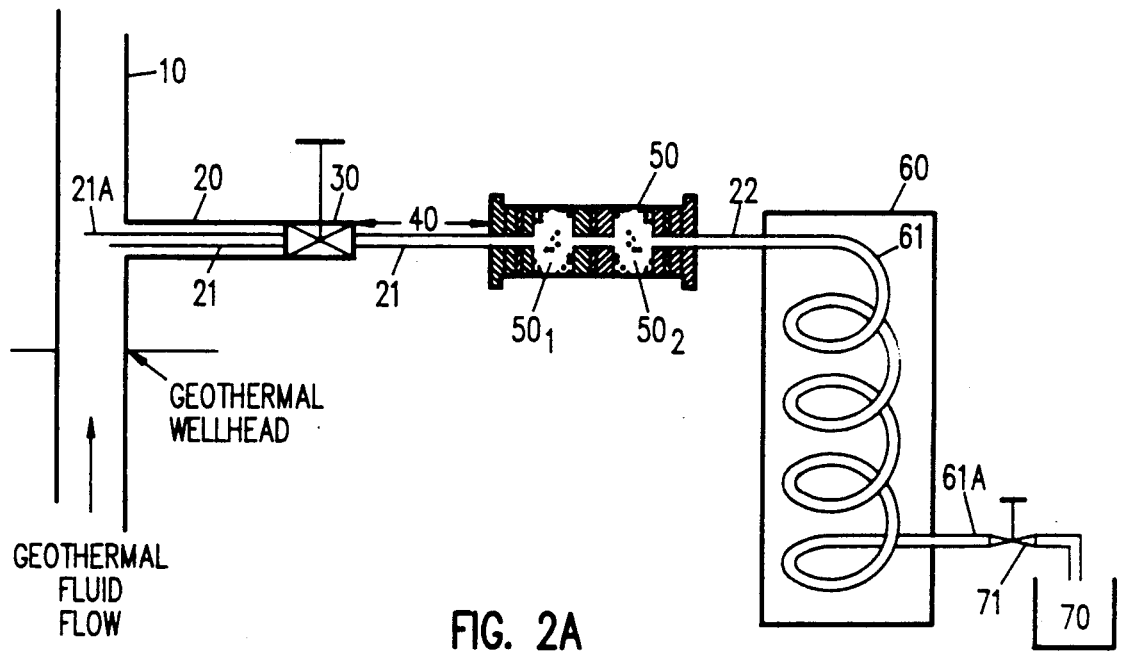
FIG. 2A illustrates an apparatus used with the compositions of the invention to extract precious metal ions from a geothermal well.
Figure 2B:
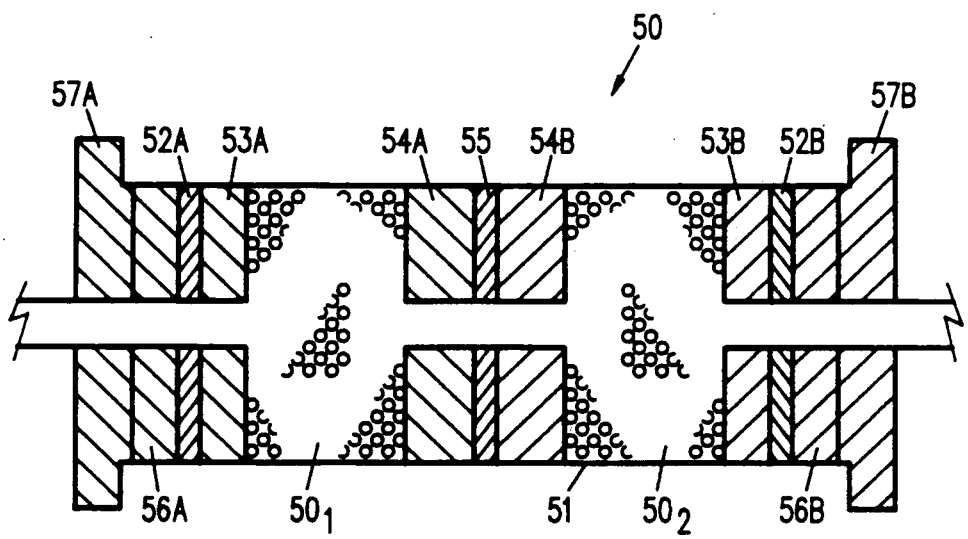
FIG. 2B is an enlarged illustration of chamber 50 in FIG. 2A.

An apparatus used to extract precious metals, such as gold and silver, from geothermal fluids is illustrated in FIGS. 2A and 2B. The geothermal fluid, which contains precious metal ions, was extracted from the ground through a geothermal source pipe 10. A pipe 20 coupled the geothermal source pipe 10 to a valve 30. Typically, pipes 10, 20 and valve 30 were at each geothermal source and the apparatus for obtaining the geothermal fluid was attached to valve 30 as shown in FIG. 2A. To extract geothermal fluid valve 30 28 was opened and pipe 21, in one embodiment a ¼ O.D. stainless steel pipe with a teflon tube liner, was extended through valve 30 into the geothermal flow in pipe 10. A teflon liner was used in pipe 21 because experiments have shown that precious metal ions in the geothermal fluid do not plate onto teflon coated surfaces. The geothermal fluid extracted through pipe 21 (which was only a fraction of the geothermal fluid flowing through pipe 10) flowed through valve 30 into a chamber 50. In one embodiment, the length 40 of pipe 21 between valve 30 and chamber 50 was insulated so that convective cooling of geothermal fluid in the pipe was reduced.

Chamber 50 was packed with beads containing immobilized microorganisms capable of binding precious metal ions. In one embodiment, chamber 50 was divided into two compartments $50_1$, $50_2$ in series. Each compartment contained about one gram of the composition of this invention. In this embodiment, chamber 50 was a ½ inch O.D. stainless steel pipe that contained a teflon cylindrical cartridge 51. (Chamber 50 and the other components in FIGS. 2A and 2B are not drawn to scale and so FIGS. 2A and 2B are only illustrative of the general layout of the components and not the relative sizes of the components.) A ¼ inch (6 mm) diameter stainless steel screen 52A (FIG. 2B) and teflon bushings 53A, 56A, each having a 0.12-inch (3 mm) diameter center hole, were placed in one end of teflon cartridge 51 in chamber 50 with end plug 57A. The composition for that compartment was placed inside the cartridge 51 and then a bushing 54A, another ¼ inch (—6 mm) diameter screen 55 and bushing 54B were inserted adjacent to the composition and the remaining composition placed in chamber 50. Finally, a third ¼ inch (6 mm) diameter screen 52B and bushings 53B, 56B with end plug 57B, were placed against the composition and chamber 50 was secured to pipes 21, 22.

Two compartments $50_1$, $50_2$ were used to obtain information about the flow rates which can be effectively used in a recovery operation from a geothermal source. For example, if the bound precious metal ions were recovered completely in entrance compartment $50_1$ and none were recovered in exit compartment $50_2$, the flow through chamber 50 was increased. On the other hand, if no bound precious metal ions or equal amounts of bound precious metal ions were found in both compartments $50_1$, $50_2$, the flow was too great for the precious metal ions to be collected efficiently and the flow was reduced.

The flow through chamber 50 was varied from about two bed volumes per minute through ten bed volumes per minute, where a bed volume is the volume of the composition in chamber 50. This translates to a flow range of from about 10 milliliters per minute to about 100 milliliters per minute through test chamber 50. The temperature and pressure conditions in chamber 50 were not known precisely because a means for measuring the temperature was not placed in chamber 50. However, in one experiment, chamber 50 was estimated to be at least 93° C. below the wellhead temperature of 260° C.

The geothermal flow passed through chamber 50 and into a condenser 60 containing a teflon-lined condenser coil 61. Condenser 60 cooled the geothermal fluid to ambient temperature and reduced the pressure to atmospheric pressure In one embodiment, condenser 60 was a coil 61 of stainless steel piping in a bucket of ice, while in another embodiment condenser coil 61 was air-cooled. The fluid from condenser 60 was collected in a sampling unit 70. Fluid collected in sampling unit 70 can be analyzed to ascertain the effectiveness of the precious metal extraction by chamber 50. The fluid flow through chamber 50 and condenser 60 into sampling unit 70 was controlled in one embodiment by a flow control valve 71 mounted on end 61A of condenser coil 61 In this embodiment, the flow was controlled by adjusting flow control valve 71.

In another embodiment, flow control valve 71 was used only as an off-on valve and a ¼ inch (0.635 cm) choke tube (not shown) connected flow control valve 71 to sampling unit 70. To obtain the desired flow, valve 71 was opened and the choke tube was appropriately bent and/or crimped.

The location of the end 21A of teflon-lined pipe 21 in well-pipe 10 may affect the fluid flow through chamber 50. Often the fluid flow in well-pipe 10 is two-phase annular flow in which an inner column of gas flow is surrounded by an annulus of liquid flow. Hence, if teflon-lined pipe 21 is inserted into either the gas flow or the gas-liquid interface in pipe 10, the fluid flow through chamber 50 includes a gas which does not contain dissolved precious metals To determine that teflon-lined pipe 21 was properly placed in pipe 10, the flow into sample collection container 70 was monitored. If bubbles were observed in the fluid flowing into container 70, the presence of gas was likely. End 21a of teflon-lined pipe 21 was then positioned in pipe 10 so that the desired flow was achieved and the number of observed gas bubbles was at a minimum, preferably zero.

In one measurement, the geothermal fluid contained approximately 258,000 ppm of dissolved solids other than precious metal ions, as shown in Table 1.

TABLE 1

Representative concentrations of dissolved solids, other than precious metal ions in a geothermal fluid.

| Material | Concentration (ppm) |
| --- | --- |
| Sodium | 56,000 |
| Calcium | 28,000 |
| Potassium | 18,000 |
| Iron | 1,700 |
| Manganese | 1,500 |
| Zinc | 530 |
| Silica | 500 |
| Strontium | 420 |
| Boron | 420 |
| Lithium | 220 |
| Ammonium | 400 |
| Barium | 110 |
| Lead | 100 |
| Magnesium | 46 |
| Arsenic | 15 |
| Cadmium | 2 |
| Copper | 2 |
| Chloride | 150,000 |
| Bromide | 100 |
| Sum of ppm | 258,065 |

The dissolved materials and the total ppm of material content in Table 1 is typical of one geothermal flow field. The dissolved material and the total ppm of dissolved material in the geothermal fluid vary for different geothermal fields.

Table 2 is a summary of a typical recovery of precious metals using the compositions of this invention from a geothermal fluid having 250,000 ppm or more of other dissolved materials in the fluid. The first column in Table 2 gives the microorganism or microorganisms immobilized in the composition. The compositions in the first column of Table 2 were prepared as described in Example 3 below. The second column gives the total volume of geothermal fluid that passed through chamber 50 containing the composition and the flow rate of geothermal fluid through chamber 50. The third through sixth columns are the weight in grams of the composition in the inlet compartment $50_1$ of chamber 50 and the outlet compartment $50_2$ of chamber 50 before and after exposure to the geothermal flow. The final column in Table 2 is the average ppm of silver recovered from the composition using the sodium cyanide recovery process described more completely below. Notice that the final column in Table 2 gives the ppm of silver recovered from the composition of this invention and not the ppm of silver in the geothermal fluid.

The dissolved precious metal content in the geothermal fluid as well as the other dissolved material content in the geothermal fluid is a function of the temperature and pressure of the geothermal well, as described above, and the mechanical operation of the well. If a geothermal well is not in equilibrium operation, the dissolved material content and the precious metal content of the gechermal fluid may be affected by factors such as plating out of precious metals on the well pipes, dilution of some dissolved materials, concentration of other dissolved materials and introduction of materials associated with the operation of the well, e.g., petroleum products. At the time of sampling for the data in Table 2, the geothermal well was recently opened and apparently had not attained equilibrium operation. Specifically, subsequent to the sampling for the data in Table 2, the precious metal content of the geothermal fluid increased and remained at the increased level.

The successful recovery of precious metals prior to the increase in the metal content of the geothermal fluid demonstrates the ability of the compositions of this invention to preferentially adsorb precious metals present in the fluid at very low levels, in the low ppm range, from an aqueous solution at about geothermal temperatures and pressures containing a very high total dissolved solid content of primarily non-precious metals which are not adsorbed To the best knowledge of the inventors this was the first demonstration of such an ability.

Moreover, Table 2 demonstrates that the composition of this invention preferentially adsorbs the precious metal silver. Given the small quantity of silver in the geothermal fluid in comparison to the total ppm of other dissolved materials in the fluid (see Table 1 for a representative composition of dissolved material in the fluid other than precious metals), the other materials would quickly saturate the binding sites of the composition of this invention and consequently prevent binding of the precious metals if the precious metals were not preferentially adsorbed. Thus the composition clearly demonstrated preferential adsorption of precious metals.

TABLE 2

Recovery of Silver from Geothermal Water.

| Immobilized Microorganisms | Geothermal Flow | Weight of Composition (grams) | | | | Silver Analysis ppm in Cyanide | |
|---|---|---|---|---|---|---|---|
| | | Inlet | | Outlet | | | |
| | | Initial | Final | Initial | Final | Inlet | Outlet |
| Laminaria-Chlorella | 1.5 l at 48 ml/min | 1.43 | 1.35 | 1.31 | 1.21 | 2.7 | 0.28 |
| Laminaria-Chlorella | 1.5 l at 19 ml/min | 1.31 | 1.31 | 1.27 | 1.38 | 2.25 | <0.1 |
| Laminaria | 4.4 l at 93 ml/min | 1.70 | 1.35 | 1.66 | 1.29 | 1.80 | <0.1 |
| Laminaria | 1.5 l at 21 ml/min | 1.83 | 1.70 | 1.76 | 1.73 | 1.35 | <0.1 |
| Laminaria | 2.4 l at 22 ml/min | 1.93 | 1.95 | 2.13 | 1.76 | 0.25 | 0.15 |
| Laminaria-Cyanidium | 1.5 l at 9.7 ml/min | 1.67 | 1.80 | 1.84 | 1.93 | 0.4 | 0.2 |
| Laminaria-Chlorella | 2.0 l at 12 ml/min | 1.31 | 1.34 | 1.43 | 1.50 | 0.3 | 0.2 |

In the recovery operation described above, the compositions of this invention were exposed to the elevated temperatures and pressures associated with the geothermal fluid for less than three hours. Hence, while the recovery operation demonstrated the ability of the compositions to recover precious metals, to withstand the geothermal temperatures and pressures, and to preferentially adsorb precious metals in the presence of extremely high total concentrations of dissolved materials, the recovery operation provided only an estimate of the ability of the compositions to withstand fluids at elevated temperatures and pressures for an extended period. Since the compositions retained their integrity, the operation suggested that extended operation at elevated pressures and temperatures would be successful.

Two extended exposures to geothermal conditions were performed to demonstrate the ability of the compositions, formed according to the principles of this invention, to withstand the dynamic elevated temperature and pressure conditions associated with geothermal fluids. To obtain these exposures, the apparatus as shown in FIG. 2A was connected to a geothermal source having a well head temperature of about 166° C. and a pressure of about 260 psig ($1.9 \times 10^8$ dyne $cm^{-2}$). Condenser 60 was air cooled and the choke line, as previously described, was used to control geothermal flow through chamber 50. A flow of 1 to 1.5 milliliters per second (ml/sec) was established as the target flow. The geothermal fluid in this well did not contain precious metals, but this was unimportant since the purpose of the test was to demonstrate the ability of the compositions to withstand flow conditions at elevated temperatures and pressures for an extended period of time.

Flow was initiated through chamber 50 containing Laminaria-Chlorella beads (See Examples 2–3.) for about 18 hours. A surface examination of the composition in the chamber after the 18 hour exposure indicated that the material held up to the exposure and appeared identical to the starting material. The weight of the composition in the chambers prior to the 18 hour test was 2.44 g and after the test the weight was 1.80 g. Thus, about 26% of the dry weight of the composition was lost during the test even though the volume of the composition did not appear to significantly decrease. This weight loss is similar to results observed in the laboratory. Specifically, it has been observed that extensive washing of Laminaria-Chlorella beads, prepared according to the principles of this invention, results in a 25–35% decrease in weight of the beads with no corresponding decrease in volume. This weight loss is attributed to the loss of calcium chloride from the beads Consequently, the weight loss observed at the elevated temperatures and pressures is not significant.

Another set of Laminaria-Chlorella beads, formed according to the principles of this invention, was exposed to the 166° C. and 260 psig ($1.9 \times 10^8$ dyne $cm^2$) geothermal fluid for 151.6 hours. During the 151.6 hour period, the geothermal flow was stopped for a maximum of about 6 hours so that the nominal exposure of the composition to wellhead conditions was about 146 hours (6.1 days). For the first 102 hours, the flow through chamber 50 was in the range of 1.32 to 1.36 ml/sec. After the first 102 hours, the flow diminished to about 1.09 ml/sec at hour 116 and the flow stopped at hour 120.6. Between hours 96 and 120, the geothermal well pump suffered a temporary shut down due to overheating but the pump was restarted in about one quarter of an hour. Between hours 120 and 144, two blockages were removed from the test apparatus and between hours 144 and the end of the test period flows sporadically diminished. The total flow through the chamber 50 during the 151.6 hours was estimated to be about 661 liters.

Examination of the composition after the extended exposure to the high pressure, high temperature geothermal fluid revealed that the composition had retained its integrity but there was some damage to chamber 50, sand in chamber 50, and fines in chamber 50 which resembled the composition in chamber 50. The weight of the fines constituted about 12 to 16 percent of the total weight of the composition in chamber 50.

The fines are not significant for two reasons. First, the size characteristics of the composition initially placed in chamber 50 were not precisely monitored. Thus, the composition probably had a size distribution ranging from fines to the intact beads that were recovered. Second, the input screen of compartment $50_1$ was damaged and sand was found in compartment $50_1$. While the output screen of compartment $50_2$ was intact, some of the fines were firmly wedged in this screen.

The distortion of the input screen and the presence of the sand in chamber $50_1$ indicates that upon restarting the geothermal pump between hours 96 and 120, the chamber was subjected to a water hammer shock wave which was sufficient to move sand into the chamber and to dislodge the input screen. As the water hammer shock wave passed through chamber 50, the shock wave apparently dissipated and was insufficient to damage the other screens in the chamber. Nevertheless, the shock wave clearly represented a significantly greater pressure than the normal pressure of the geothermal fluid. Since the compositions of this invention crush under greater than moderate finger pressure, a water hammer shock wave that was sufficient to distort and dislodge the screen probably exerted more than moderate finger pressure on the composition in the second chamber. Accordingly, the water hammer probably damaged the beads in chamber 50 and contributed to the generation of the fines. This conclusion is supported by the observations that chamber 50 plugged after the restart of the well pump and that no flow problems were encountered prior to the stoppage of the pump.

Each of the compositions of this invention is formed according to the steps previously described. Moreover, as described in the Examples below, each of the compositions has similar physical characteristics. Therefore, based upon this exposure and the static experiments, described above, the compositions of this invention are suitable for extended exposure to a high temperature, high pressure environment.

In addition to the extraction and recovery of silver from geothermal fluid, compositions made according to the principles of this invention have been used to extract gold and platinum from geothermal fluids using the apparatus illustrated in FIG. 2A. Table 3 lists the compositions used to extract gold from geothermal fluids at two geothermal well sites. The first column in Table 3 gives the microorganism or microorganisms immobilized in the composition, using the principles of this invention. The compositions in the first column of Table 3 were prepared as described below in Example 1. The remaining columns in the table list the average ppb (parts per billion) of gold recovered from the composition using the sodium cyanide recovery process described more completely below. Again, the ppb of gold recovered from the composition is presented in Table 3 and not the ppb of gold in the geothermal fluids. A value of 10 ppb in Table 3 translates to approximately 0.5 ppb gold recovered from the original geothermal fluid.

In one experiment, the geothermal fluid containing the gold metal ions also contained approximately 3000 ppm of dissolved solids other than precious metal ions, as shown in Table 4. The dissolved materials and the total ppm of material content in Table 4 is typical of one geothermal flow field (which differs from the flow field used to generate Table 1). Comparison of Table 1 and Table 4 demonstrates the variability of the dissolved material and total ppm material content in different geothermal flow fields.

TABLE 3

| | | Recovery of Gold from Geothermal Water | | |
| --- | --- | --- | --- | --- |
| | Analytical Sample | Gold in Extract (ppb) | | Total |
| Immobilized Microorganism | Size (grams) | Entrance Chamber | Exit Chamber | Gold Extracted |
| Chlorella | 0.1 | 9.6 | 6.5 | 16.1 |
| | 0.1 | 7.8 | — | — |
| | 0.1 | 11.2 | 10.2 | 21.4 |
| | 0.1 | 2.1 | 1.7 | 3.8 |
| | 0.1* | 3.5 | 3.1 | 6.6 |
| | | 6.9 AVG | 5.4 AVG | 12.0 |
| Cyanidium (medium sized beads) | 0.1 | 3.3 | 1.0 | 4.3 |
| | 0.1 | 8.5 | 1.1 | 9.6 |
| | 0.1* | 1.1 | 1.0 | 2.1 |
| | 0.1* | 4.3 | 1.0 | 5.3 |
| | | 4.3 AVG | 1.0 AVG | 5.3 AVG |
| Laminaria | 0.1 | 4.0 | — | — |
| | 0.1* | 5.6 | 5.1 | 10.7 |
| | | 4.8 AVG | 5.1 AVG | 10.7 AVG |
| Cyanidium (small beads) | 0.1 | 2.7 | 11.7 | 14.4 |
| | 0.1 | 1.5 | 3.5 | 5.0 |
| | 0.1* | 3.6 | — | — |
| | 0.1* | 2.9 | — | — |
| | | 3.2 AVG | 7.6 AVG | 9.7 AVG |

*Homogeneous sample

TABLE 4

| Representative Concentrations of Dissolved Solids Other than Precious Metal Ions. | |
| --- | --- |
| Material | Concentration (ppm) |
| Lithium | 770 |
| Potassium | 120 |
| Calcium | 2 |
| Silica | 780 |
| Chloride | 1100 |

TABLE 4-continued

Representative Concentrations of Dissolved Solids Other than Precious Metal Ions.

| Material | Concentration (ppm) |
|---|---|
| Sulfate | 40 |
| Bicarbonate | 160 |
| Sum of ppm | 2972 |

As shown in Table 3, the gold recovered from the compositions analyzed ranged from 5.3 ppb to 12.0 ppb. Tables 3 and 4 further support the observation that the composition of this invention preferentially adsorbs precious metal ions Given the small quantity of gold ions present in the geothermal fluid in comparison to the total ppm of other dissolved materials in the fluid, the other materials would quickly saturate the binding sites of the composition if the precious metals were not preferentially adsorbed The mechanism for the preferential binding of precious metals to the compositions of this invention in the presence of other dissolved materials is not fully understood However, previous studies have demonstrated that algae have a greater affinity for precious metal ions than for other metal ions. Accordingly, it is believed that the preferential binding of precious metal ions to the compositions of this invention is associated with the greater affinity of algae for precious metal ions.

In each extraction and recovery operation reported in Table 3, chamber 50, as shown in FIGS. 2A and 2B, was disassembled and the composition from the entrance and exit compartments $50_1$, $50_2$ dried and weighed. Each compartment $50_1$, $50_2$, as previously described, initially contained approximately 1 gram of the composition.

For the initial recovery of the gold bound to the composition, a 0.1 gram sample of the composition in each chamber was used. The 0.1 gram sample was placed in a 0.5 percent solution of sodium cyanide and heated at 85-90° C. for 20 hours. The extract was then analyzed for gold. Several repeat extractions were made on other 0.1 gram portions of the composition from each chamber. Some variations in the repeat analyses were observed. This variation is attributed to variations of binding within chamber 50. Since the dissolved precious metal ion concentration in the geothermal fluid was relatively low and the collection times were only a few hours, more gold is anticipated to be bound near the entrance of chamber 50 than in the interior of chamber 50 and consequently the amount of bound gold is anticipated to decrease with the distance from the entrance of the chamber. Thus, to accurately ascertain the average amount of bound gold, a homogeneous sample was required.

Therefore, after the 0.1 gram sample analyses, the remaining material was ground to make a homogenous sample. The sodium cyanide extraction procedure was performed on 0.1 gram samples of the homogenous ground material. The values in Table 3 include the .0.1 gram samples, the 0.1 gram homogeneous samples and an average of the one-tenth gram extractions with the extraction from the homogeneous samples.

The sodium cyanide extraction procedure, mentioned above, used sodium cyanide in the presence of oxygen to strip the bound gold from the immobilized microorganisms in the compositions of this invention. Sodium cyanide is one example of an eluting agent. As previously described, the bound gold has a high affinity for the immobilized microorganisms, but the bound gold may be effectively stripped by using an eluting agent, either a complexing agent or a chelating agent, which has a higher affinity for the bound gold than do the immobilized microorganisms in the compositions of this invention. The affinity of the eluting agent is not the only factor in determining the recovery of the precious metal bound to the immobilized microorganisms. The concentration of the eluting agent also directly affects the stripping of the bound metal.

Generally, the greater the concentration of the eluting agent and the greater the affinity of the eluting agent for gold, the greater the recovery of gold from the immobilized microorganisms to which the gold was bound. One restriction on the selection of the eluting agent is that the complex formed by the eluting agent with the bound gold should be soluble so that this complex can be removed from the vicinity of the composition so that the compositions of this invention can be reused without further processing.

In addition to sodium cyanide, other complexing agents suitable for stripping bound gold from the immobilized microorganisms in the compositions of this invention include dithiocarbamate, thiourea, dithizone, tetron and 4,4'-Bis(dimethylamino)thiobenzophenone. While gold has been used as an example of a precious metal recovered by an eluting agent, the eluting agents can also be used to recover other precious metals, base metals and other metal ions which are bound to the immobilized microorganisms in the compositions of this invention. The extraction and recovery of base metals and other metal ions are described below.

The recovery of precious metals from a geothermal fluid containing as high as 250,000 ppm of other materials near the wellhead and the recovery of precious metals from aqueous solutions and saline solutions demonstrate the ability of the compositions of this invention to effectively preferentially bind precious metal ions at high temperatures and pressures in the presence of a high level of other suspended or dissolved materials. This ability is important for recovery of precious metals from geothermal fluids as well as for the recovery of precious metals in high temperature process streams because in both applications the precious metal ions in the solution are only a very small fraction of the materials in the aqueous solution.

In some geothermal fluids or perhaps in certain process streams, gold ions, silver ions, and platinum ions as well as other precious metal ions may be contained in the aqueous solution As described above, the compositions of this invention preferentially adsorb these precious metal ions in comparison to other metal ions so that the compositions in a process stream containing one or more precious metal ions will have each of the precious metal ions bound to the composition As an example, assume that platinum ions, silver ions, and gold ions will be bound to one of the compositions of this invention To selectively recover the precious metal ions, one of the following procedures would be used.

In a first procedure, the silver ions bound to the compositions of this invention would be recovered by using an eluting agent such as thiosulfate that would preferentially strip the bound silver ions from the composition. After the stripping of the silver ions, one of the complexing agents described above for stripping bound gold from immobilized microorganisms would be used to strip the bound gold metal ions from the composition.

Finally, the composition would be burned to recover the platinum ions.

In prior studies, it has been observed that gold ions bound to algae are reduced to gold(0) over time. Accordingly, the compositions of this invention may reduce bound gold ions to gold(0) after a period of time.

In a second procedure, assuming the bound gold ions have been reduced to gold(0), the gold ions, silver ions and platinum ions would be selectively recovered by using the sodium cyanide process described above. To recover the bound silver ions, the composition would be placed in a sodium cyanide solution with no oxygen present. The sodium cyanide would selectively strip the bound silver ions from the composition. While this stripping may also remove a small percentage of the bound platinum, the majority of the metal recovered will be silver. After stripping the bound silver ions, the gold(0) would be stripped by placing the composition in a sodium cyanide solution in the presence of oxygen. The oxygen oxidizes the gold and the sodium cyanide complexes the oxidized gold so that both oxygen and cyanide act as eluting agents and strip the bound gold from the composition. After stripping the bound silver and gold metal ions, the composition would be burned to recover the platinum ions.

In the prior art, pH adjustments were used to selectively remove one metal from an aqueous solution containing several metals and pH gradients were used to selectively extract one metal from a composition having several bound metals. However, in high temperature and high pressure geothermal flow fields, pH control of the fluid is not feasible Similarly, in many process streams, pH control of the stream is not feasible and so the prior art method of using pH adjustments to selectively extract metals from an aqueous solution would be ineffective. Moreover, as described previously, while the prior art silica-alga compositions function satisfactorily at ambient temperatures, these compositions are not suitable for use in high temperature fluids. However, metal ions may be selectively removed from geothermal fluids and high temperature process streams by selection of the metal ion-bonding material added to the first mixture as previously defined. In this embodiment, the composition would preferentially extract the selected metal ion from the aqueous solution so that the multiple stripping would be unnecessary to recover the bound metal ions. However, if the aqueous solution contained multiple metal ions, several compositions would be required to selectively remove all the ions in the solution.

Not only do the compositions of this invention function at high temperatures and pressures, they function at ambient temperatures to remove a wide variety of metal ions more effectively than the prior art compositions containing immobilized microorganisms. Moreover, using the compositions of this invention, the metals bound to the immobilized microorganisms may be stripped using alkaline eluents as well as acidic eluents. After stripping the bound metal from the compositions, the compositions can be effectively reused in an aqueous solution containing one or more dissolved metal ions. The prior art methods of silica gel immobilization were only compatible with acidic solutions and could not be used as effectively with either alkaline solutions or an alkaline eluent.

Compositions formed according to the principles of this invention have been used in several binding experiments at ambient temperatures to extract soft metal ions (cadmium in one experiment, Example 13, and gold cyanide in another experiment, Examples 14 and 15), hard metal ions (arsenic, Example 16), and intermediate metal ions (nickel in one experiment, Example 17, and copper in another experiment, Example 18) from an aqueous solution Examples 13-18, described below, demonstrate the ability of the compositions of this invention to effectively extract other metal ions in the same classification, hard, intermediate, or soft, as defined previously, from an aqueous solution. More than 95% of the cadmium, gold cyanide and copper in the aqueous solution was adsorbed. Arsenic adsorption was better than 90%, while the nickel adsorption ranged from 80% to 90%.

The nickel ions were in a contaminated groundwater sample The composition of the groundwater sample is given in Table 5. Since the groundwater sample contained several materials each having concentrations in the groundwater about 100 fold greater than the concentration of the nickel in the groundwater, the composition of this invention preferentially bound the base metal nickel

TABLE 5

| Concentration of Dissolved Materials | |
|---|---|
| Material | Concentration (ppm) |
| Calcium | 340–430 |
| Magnesium | 99–120 |
| Sodium | 170–180 |
| Sulfate | 820–1200 |
| Chloride | 270–300 |
| Nickel | 2.6–2.9 |

After adsorption of the metal ions by the compositions of this invention, the bound metal ions were successfully recovered. As described in Example 13, the bound cadmium was recovered from the beads by stripping them with 0.3 M $H_2SP_4$. The gold bound to the beads was recovered using 0.1 M NaOH as described in Example 15. In addition, 0.5M NaOH and 1 M NaOH effectively stripped bound gold from the beads. In Example 17, the beads having bound nickel were stripped of the nickel by using 10% hydrochloric acid. All of the bound nickel was stripped using hydrochloric acid. In these examples, acids and a base were used as the eluting agent. Other eluting agents and/or use of an eluting agent in combination with pH control of the stripping solution, as discussed above in the prior art section, can also be used to effectively strip bound metal ions from the compositions of this invention.

The binding of cadmium in an aqueous solution, a groundwater sample, at ambient temperatures to Laminaria-Chlorella beads of this invention occurred in the presence of high concentrations of magnesium and calcium, as well as other dissolved materials. Specifically, the composition of the groundwater sample is shown in Table 6.

TABLE 6

| Concentration of Dissolved Materials in a Superfund Groundwater Sample. | |
|---|---|
| Material | Concentration (ppb) |
| Aluminum | 1500 |
| Calcium | 7440 |
| Cadmium | 130 |
| Iron | 1900 |
| Magnesium | 3800 |
| Sodium | 7000 |
| Total Hardness (mg/l) | 44 |

Thus, unlike conventional ion exchange resins, the Laminaria-Chlorella beads adsorbed cadmium in the presence of dissolved materials, calcium and magnesium, which would render ion exchange resins unusable.

The ability of the compositions of this invention to adsorb gold cyanide in the presence of high concentrations of other dissolved materials is very useful in the electroplating industry. For example, printed circuit boards are immersed in a solution of gold cyanide plating chemicals and an electrical current is applied to the boards to plate the gold onto the boards. After the plating, the boards are removed from the plating solution and rinsed. The rinse water contains low levels of the gold cyanide as well as other dissolved materials in the plating solution. The gold can then be recovered from the rinse water using the compositions of this invention thereby salvaging gold and purifying the rinse water.

To demonstrate the ability of compositions of this invention to extract gold from electroplating rinse water irrespective of other dissolved materials in the solution, three proprietary electroplating solutions were obtained. The solutions are referred to as Solution A, Solution B, and Solution C respectively. Solution A was an acid gold cyanide plating solution. Solution B was a neutral gold cyanide plating solution, and Solution C was another acid gold cyanide plating solution which was obtained from a different supplier than the supplier of Solution A. The source of the electroplating solution is unrelated to this invention. The important aspect is that the solutions contained dissolved materials in addition to the dissolved precious metal ions.

The gold compound in each of these solutions was potassium gold cyanide ($KAu(CN)_2$). While the solutions A, B and C were proprietary and the precise composition of the dissolved materials in the solutions unknown, typical compositions and descriptions of neutral gold cyanide solutions and acid gold cyanide solutions are given in "Metal Finishing Guidebook Directory, 1988," Metals and Plastics Publications, Inc., Hackensack, N.J., pp. 240-242. Typical nonproprietary neutral cyanide solutions contain either 8-20 g/l potassium gold cyanide and 80 g/l monopotassium phosphate or 8-20 g/l potassium gold cyanide and 70 g/l potassium citrate. A typical nonproprietary acid gold cyanide solution contains 8 g/l potassium gold cyanide, 60 g/l citric acid and 0.2-0.5 g/l cobalt or nickel. Hence, assuming the proprietary acid gold cyanide solution has a composition similar to the composition of the non-proprietary solutions, when a proprietary solution is diluted so that the solution contains 10 ppm of gold cyanide, the diluted proprietary solution probably had on the order of at least 70-80 ppm of other dissolved materials.

To simulate an electroplating rinse solution, each of the solutions A, B and C was diluted so that the concentration of gold was 10 ppm. After dilution, each solution was adjusted to a pH of about 3 with sulfuric acid. The gold cyanide complex is stable at pH 3, but adjustments to lower pH values promotes dissociation of the cyanide from the complex and results in the generation of toxic cyanide gas.

In one binding experiment, Laminaria-Chlorella beads, prepared according to the principles of this invention, were soaked overnight in 2% hydrochloric acid. The beads that settled to the bottom of the acid were removed and packed into a column so that the total bed volume was about 5 ml. The packed column was flushed sequentially with 2% hydrochloric acid, distilled water, 0.1 M sodium citrate at pH 3, and finally with more distilled water. The acid/water/sodium citrate/water processing stripped any excess metal bound to the immobilized algae and removed solubilized calcium. Three separate 5 ml bed volumes were prepared using this process.

A total of 152 bed volumes (260 ml) of diluted Solution A was pumped through the column and fractions of the column effluent were collected for analysis. The gold concentration in the effluent gradually increased from 0 up to 0.7 ppm at the 152 bed volume fraction. Thus, the Laminaria-Chlorella beads were still extracting 93% of the gold from the aqueous solution after passage of 152 bed volumes.

Gold bound to the Laminaria-Chlorella beads at pH values ranging from 7.5 to 3, but the affinity of the immobilized algae beads for the gold increased as the pH approached 3. In prior studies which used algae to remove metal ions from an aqueous solution, the affinity of the algae for metal ions was pH dependent and this affinity-pH dependence was used to selectively remove metal ions from an aqueous solution and to selectively strip metal ions bound to the algae Since the composition of this invention shows an affinity-pH dependence also, this suggests that the elevated temperature used to form the composition did not alter the basic algal properties. Therefore, in addition to the unique high temperature adsorption capability previously described in conjunction with this invention, the compositions of this invention are believed to possess the same basic metal ion binding properties and characteristics as the prior art compositions, described previously. The selective base metal ion binding capability of the compositions of this invention, described above, and the stripping of the bound base metal ions from the compositions are further evidence that the basic algal properties are not changed by the elevated heating used to form the compositions of this invention.

The bound gold from Solution A was stripped from the Laminaria-Chlorella beads using sodium cyanide. All of the bound gold was stripped within the passage of 14 bed volumes of sodium cyanide through the packed column The eluate was dark in color, indicating that some material was being removed from the beads along with the gold.

Diluted Solution B and diluted Solution C were each pumped through a packed column containing one of the 5 ml volumes of Laminaria-Chlorella beads preferred as described above. A total of 502 bed volumes of Solution B was passed through the packed column. The gold concentration in the effluent gradually increased from 0 to 1.8 ppm at the 502 bed volume fraction.

The bound gold from Solution B was stripped using sodium cyanide. Essentially 100% of the gold bound to the Laminaria-Chlorella beads was stripped from the beads using about 22 bed volumes of sodium cyanide. Again, the stripping eluate had a dark brown color indicating that some material was being removed from the beads along with the bound gold.

A total of 198 bed volumes of diluted Solution C was Il passed through the third packed column. The gold concentration in the effluent gradually increased from 0 to 1.31 ppm in the 198 bed volume fraction After passage of 198 bed volumes of diluted Solution C through the column, the bound gold was stripped from the beads of Laminaria-Chlorella using 0.1 M sodium hydroxide. Essentially 100% of the bound gold was stripped after passage of four bed volumes of 0.1 M sodium hydroxide through the packed column, and all of the bound gold had been stripped within the passage of eight bed volumes. Thus, sodium hydroxide was much better at stripping gold bound to *Laminaria-Chlorella* beads of this invention than the sodium cyanide used with Solutions A and B.

In each of the above processes the eluate in the stripping process was discolored, but the apparent volume of the beads remained unchanged. Since the compositions of this invention are a dark color, it appears that material from the beads leached into the eluent. Hence, experiments were performed to determine whether the dark color of the eluate could be eliminated. Specifically, after the column, which had been used to extract the gold from diluted Solution C, was stripped using sodium hydroxide, another 200 bed volumes of 0.1 M sodium hydroxide were passed through the packed column. The eluate was darkly colored, but not as dark as the eluate from the gold stripping. After elution with sodium hydroxide, the packed column was washed with distilled water, sodium citrate, and distilled water. This column washing adjusted the pH of the column so that the column pH was the same as the pH of diluted Solution C. After the column pH adjustment, 396 bed volumes of diluted Solution C were passed through the column (Cycle 2). After bed volume 396, only 1.2 ppm of gold was in the eluate. Hence, after the sodium hydroxide elution and subsequent washing, the column performed twice as well in removing gold ions from an aqueous solution as it had before this elution and washing.

The bound gold was stripped from the packed column using 0.1 M sodium hydroxide as before. Again, the majority of the gold was recovered within the first four bed volumes and essentially all of the gold was stripped from the column within the first eight bed volumes. The stripped fractions were light brown in color, indicating that much less material was being removed from the beads with the sodium hydroxide.

The process of washing the column with water, sodium citrate, and water and then passing diluted Solution C through the column and subsequently stripping the bound gold with sodium hydroxide was repeated three more times (Cycles 3-5) so that a total of five strippings occurred. Then, an aqueous solution containing 10 ppm gold was prepared. After washing of the column with water and sodium citrate, the aqueous solution was passed through the column (Cycle 6). After passage of 396 bed volumes, the bound gold was stripped using sodium hydroxide. While in Cycles 3-6 the ppm of gold in the eluate increased somewhat after the 396 bed volumes were passed through the column, the overall performance of the column was better after the sodium hydroxide washing than the initial performance in Cycle 1. After the sixth stripping, the stripped fractions had a very pale straw-yellow color indicating that very little material was being leached from the beads.

Thus, a thorough washing of the beads prior to column use improves the performance of the beads with respect to precious metal ion-binding and removes dark pigments which color the stripping fractions. Washing should similarly improve the performance of the compositions of this invention in binding other metal ions and even base metal ions. The beads in the column were not affected by the repeated exposure to sodium hydroxide, unlike the prior art silica-algae compositions that would hydrolyze. Also, the repeated cycling of the beads of this invention did not result in any visible change in volume of the beads, i.e. no swelling was observed, unlike the prior art compositions that swelled significantly.

Several embodiments of this invention have been described In each embodiment, a metal ion-binding microorganism was immobilized using one of the immobilization steps of this invention and the immobilized metal ion-binding microorganisms were heated at an elevated temperature for several hours to form one of the compositions of this invention.

The compositions of this invention are suitable for removing metal ions from aqueous solution over a broad range of temperatures and pressures. The metal ions that are adsorbed by the compositions of this invention include precious metal ions, hard metal ions, intermediate metal ions and soft metal ions as previously defined. As previously defined, the soft, intermediate, and hard metal ions include some precious metal ions as well as base metal ions.

The metal ions bound to the compositions of this invention have been recovered by contacting the composition with an eluting agent Unlike prior art silica-algae compositions, the compositions of this invention are suitable for use with alkaline eluting agents Further, the compositions of this invention remove selected metal ions from an aqueous solution having high concentrations of other dissolved materials and do not generate additional toxic wastes.

The embodiments described herein are illustrative only and are not intended to limit the scope of the invention. In view of this disclosure, other applications and embodiments of compositions formed according to the principles of this invention will be apparent to those skilled in the art. The principles of this invention are further defined by the following examples.

EXAMPLE 1

This is a first procedure for immobilizing metal ion-binding microorganisms in alginate beads.

Two grams of alginic acid are very slowly added to 100 ml of 0.1 M NaOH. Since alginic acid does not dissolve well, the acid forms clumps if it is added too rapidly to the sodium hydroxide. In another embodiment, 0.15 M NaOH was used in place of the 0.1 M NaOH with satisfactory results. The NaOH-alginic acid mixture was stirred until the alginic acid completely dissolved.

After dissolving alginic acid in NaOH, 8 grams of algae were added slowly to the NaOH-alginic acid (sodium alginate) solution The resulting mixture was stirred for 60 minutes to obtain a homogeneous slurry.

Spherical beads were formed by adding individual drops of the slurry to 3% $CaCl_2.2H_2O$ in distilled $H_2O$. The size of the final bead is determined by the size of the drop added into the calcium chloride solution.

Figure 3A:
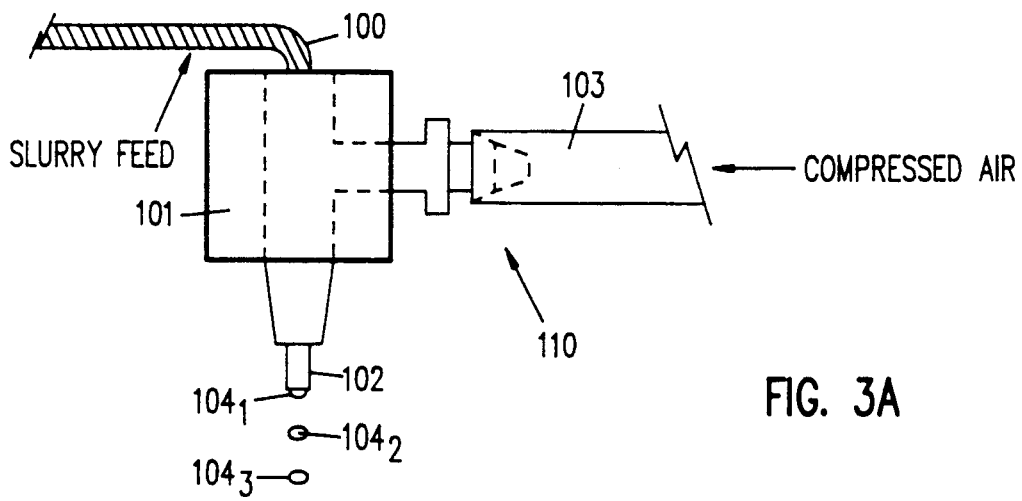
FIGS. 3A and 3B illustrate an alternative apparatus for forming single beads of the composition of this invention.

Two alternative procedures were developed for producing small beads (here "small" means a diameter of less than 1.0 mm) In a first apparatus 110, as illustrated in FIG. 3A, the alginic acid/alga slurry was fed through line 100 into a fixture 101 having an orifice 102 of a selected size and a source of compressed air 103.

When a bead 104₁ was formed on orifice 102 the compressed air blew the forming bead 104₁ from the end of orifice 102 before the bead became too large. With apparatus 101 the compressed air flow must be readjusted for either changes in the consistency of the slurry feed which occur over time or changes in the algal species in the slurry.

Figure 3B:
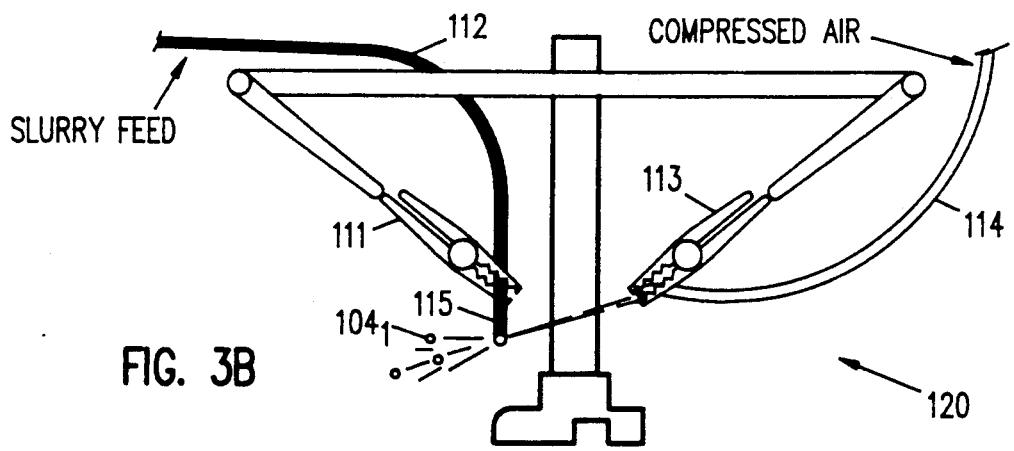

Another apparatus, illustrated in FIG. 3B, utilized a soldering stand 120, where one alligator clip 111 held a slurry feed line 112 and a second alligator clip 113 held the compressed air line 114. As a bead $104_1$ formed at the orifice 115 on the end of slurry feed line 112, the compressed air was used to blow off bead $104_1$. For each orifice size, the slurry feed rate and the compressed air were adjusted to assure proper bead formation.

The beads, which formed upon the slurry contacting the calcium chloride solution, float on the surface of the solution After the beads are formed, they are removed from the calcium chloride solution and rinsed for several minutes (1–10 minutes) in distilled water. The rinse time was selected so that any excess $CaCl_2$ was effectively removed but not so long that calcium leached out of the alginate mixture.

The rinsed beads were transferred to a steel tray and dried overnight at about 110° C. The drying shrinks the beads so that they are only one-tenth to one-third the original volume. Any excess water must be removed from the steel tray prior to drying to prevent the beads from losing their integrity. After drying, the beads were quite hard, but if the beads were rehydrated they became easy to crush under finger pressure.

The oven dried beads were heated in a muffle furnace in a porcelain crucible with a lid at about 400° C. for about four hours. While the size of the beads did not change significantly in this heating step, the beads lost up to 50% of their mass. The final product had a gray-black cast and the beads crushed easily under moderate finger pressure.

The above preparation was prepared in the described proportions with the alga Chlorella in one embodiment and the alga Cyanidium in another embodiment. Preparations using the alga Laminaria utilized only 4 grams of the alga Specifically, for 50 ml of 0.1 M sodium hydroxidealginic acid mixture, 4 grams of Chlorella were added but only 2 grams of Laminaria were added. The addition of more Laminaria causes the slurry to become too thick to stir and pump effectively.

The formation of beads using this procedure is limited to one bead at a time. The slurry is not suitable for extrusion. Also, the volume of calcium chloride solution must remain constant and gently stirred, keeping the surface as undisturbed as possible.

EXAMPLE 2

This is a second procedure for immobilizing metal ion-binding microorganisms.

To prepare this composition, 3 grams of less than 100 mesh (~149 microns) Laminaria powder were slowly added to 50 ml of 1 M NaOH so that no clumps were formed. The mixture was stirred for 60 minutes.

Three grams of less than 100 mesh (~149 microns) Chlorella powder were added to the mixture and the Chlorella-Laminaria slurry was stirred for one hour to obtain a homogeneous slurry.

Beads were formed by dropping the homogeneous Chlorella-Laminaria slurry into 3% $CaCl_2$ solution, which was unstirred. The beads formed and settled to the bottom of the solution The beads were removed from the 3% calcium chloride solution, rinsed briefly, 1–10 minutes, and placed on a steel tray. All excess water was removed from the tray. The rinse time was selected so that any excess $CaCl_2$ was effectively removed but not so long that calcium leached out of the alga mixture.

The tray was placed in an oven, and the beads were dried overnight (about eighteen hours) at a temperature of about 110° C.

The dried beads were placed in a porcelain crucible with lid and heated for about four hours at about 400° C.

The Chlorella-Laminaria beads formed by this process resisted crumbling. Again, the slurry mixture was not suitable for use with extrusion techniques to form the beads so that the beads must be formed one at a time using one of the apparatus described in Example 1.

In another embodiment, Cyanidium-Laminaria beads were formed using the above procedure. However, in this embodiment, 4 grams of less than 100 mesh (~149 microns) Laminaria powder were used instead of the 3 grams described above. The Cyanidium-Laminaria beads were softer than the Chlorella-Laminaria beads.

In yet another embodiment of this procedure, pure Laminaria beads were formed. In this embodiment 6 grams of less than 100 mesh (~149 microns) Laminaria powder were added to 50 ml of 1 M sodium hydroxide. The pure Laminaria beads were slightly softer than the Chlorella-Laminaria beads.

The procedure of this example was also used to form beads of Laminaria-Spirulina, but these beads were very soft and fragile and crushed under a soft touch. Thus, Laminaria-Spirulina beads prepared according to this procedure are probably not suitable for use in high pressure flows.

The production of beads was limited by the buildup of a film on the surface of the calcium chloride solution.

EXAMPLE 3

This example illustrates the preferred procedure for immobilizing metal ion-binding microorganisms or other metal ion-binding material.

Twenty grams of less than 100 mesh (~149 microns) Laminaria powder were slowly added with stirring to 500 ml of 0.30 M NaOH. The Laminaria powder must be added to the sodium hydroxide so that no clumps are formed. Moreover, the less than 100 mesh (~149 microns) Laminaria powder is required for proper formation of the beads as described below.

The Laminaria-NaOH mixture was stirred for 60 minutes. After the one hour stirring, 30 grams of less than 100 mesh (~149 microns) Chlorella powder were slowly added to the Laminaria-NaOH mixture with stirring. The Chlorella powder must also be added so as to avoid clumps. This mixture was stirred for 60 minutes to form a homogeneous Chlorella-Laminaria slurry.

The Chlorella-Laminaria slurry was passed through a syringe tip about 6–8 inches above the surface of a 3% $CaCl_2$ solution. The slurry was added to the unstirred calcium chloride solution in an extrusion fashion. The flow rate of the slurry was in the range of 8–15 ml/min. The flow rate depended upon the viscosity, the greater the viscosity the lower the flow rate and conversely. As the slurry stream hit the surface of the calcium chloride solution, the stream broke into numerous beads of various sizes, ranging from 2–3 mm diameter and smaller. The formation of the beads was very rapid compared to the one-drop procedures of Examples 1 and 2.

The best results have been obtained using a 20-gauge (812.8 microns) stainless steel needle with a beveled tip as the orifice.

Most of the beads sank once they hit the calcium chloride solution, but a few floated on the surface. Since the beads sank, they were taken out of the incoming stream and clumping of the beads on the surface of the calcium chloride solution was thus avoided.

After the beads were formed, the beads were removed from the calcium chloride solution and rinsed briefly (1-10 minutes) in deionized, distilled water. The rinse time was selected so that any excess $CaCl_2$ was effectively removed but not so long that calcium leached out of the alginate mixture.

The rinsed beads were transferred to a steel tray for overnight, about 18 hours, drying at about 110° C. The beads decreased in volume by three to ten times upon drying and were quite hard to the touch.

The dried beads were placed in a porcelain crucible which was covered with a lid and then placed in a furnace and heated for about four hours at about 400° C. The beads did not decrease significantly in size but the beads lost up to 50% of their mass.

This procedure, in the proportions described above, has been used successfully to form beads of Chlorella and Laminaria, Spirulina and Laminaria, and Cyanidium and Laminaria. Moreover, as illustrated in Example 9, the procedure has been used to immobilize metal-ion binding microorganisms which are not algae.

Based upon Example 4, described below, to form beads of pure Laminaria, 4.0 grams of Laminaria powder, less than 100 mesh ($\sim$149 microns) in size, were added to 50 ml of 0.30 M NaOH and stirred for 60 minutes. The resulting slurry was passed through the orifice into the calcium chloride solution as described above.

The formation of beads according to this procedure was limited by the leaching of material from the beads onto the surface of the calcium chloride solution. When a film formed on the surface of the calcium chloride, further bead formation was inhibited.

EXAMPLE 4

This example uses various combinations of Laminaria powder and sodium hydroxide to determine the best combination for use in Example 3.

In this procedure, the selected amount of less than 100 mesh ($\sim$149 microns) Laminaria powder was slowly added to 50 ml of the selected concentration of sodium hydroxide to form a slurry and to avoid clumping.

After stirring for 60 minutes, the homogeneous slurry was passed through a 20 gauge stainless steel syringe needle assembly onto a fresh solution of unstirred 3% $CaCl_2.2H_2O$ as described in Example 3.

The beads, formed when the slurry interacted with the calcium chloride solution, were removed from the calcium chloride solution, rinsed briefly with deionized water, as described in Example 3, and, dried overnight, about 18 hours, at 110° C. on a steel tray.

The dried beads were placed in a covered crucible and heated in an oven for about four hours at 400° C. The beads were then examined for hardness and shape.

The selected concentration of sodium hydroxide and the selected amount of Laminaria are listed in the first and second columns of Table 7, respectively. The third column describes first the preparation and then the analysis of the beads. The statement "OK" in column 3 means that the hardness and the shape of the beads were acceptable. A ratio of 50 ml 0.3 M NaOH and 4 grams of less than 100 mesh ($\sim$149 microns) Laminaria powder was selected to form beads of pure Laminaria according to the procedure in Example 3.

TABLE 7

Effect of Variation of NaOH Concentration and Amount of Laminaria Used to Make Beads

| NaOH,M | Laminaria (g) | Note |
|---|---|---|
| .75 | 6 | Prep went well; beads OK, but beads crumble if squeezed |
| .50 | 6 | Prep viscous; beads OK |
| .30 | 6 | Didn't work |
| .30 | 4 | Prep worked well; beads OK |
| .30 | 2 | Prep is less viscous; beads OK |
| .15 | 4 | Prep very thick; beads are soft |
| .15 | 2 | Prep less viscous; beads are not very good |
| .05 | 4 | Prep very thick; beads crumble if squeezed |
| .05 | 2 | Prep thin; beads OK but beads crumble if squeezed |
| .05 | 3 | Prep is thin, but it worked; beads crumble if squeezed |
| .01 | 2 | Prep is thin; beads semi-hard but beads don't form well |
| .01 | 3 | Prep is thin; beads semi-hard, but beads don't form well |
| .01 | 4 | Prep is thick; semi-hard beads aren't round |

EXAMPLE 5

This example illustrates the procedure used to determine the best ratio of Laminaria powder and Chlorella powder for use in Example 3 with 0.30 M NaOH. The criteria used to select the best ratio of Laminaria powder and Chlorella powder were (i) the ease of bead formation and (ii) whether a crust formed on the calcium chloride solution during formation of the beads.

The basic procedure was as in Example 3. Specifically, the selected amount of less than 100 mesh ($\sim$149 microns) Laminaria powder was slowly added to 50 ml of 0.30 M NaOH so as to avoid forming clumps. The sodium hydroxide-Laminaria mixture was stirred for 60 minutes. After the 60 minutes of stirring, the selected amount of less than 100 mesh ($\sim$149 microns) Chlorella powder was slowly added to the sodium hydroxide-Laminaria mixture so as to avoid forming clumps. The resulting slurry was stirred for an additional 60 minutes.

The homogeneous slurry was passed through the 20 gauge orifice located six to eight inches above a fresh solution of 3% $CaCl_2.2H_2O$.

The beads that formed when the slurry interacted with the calcium chloride solution were removed and rinsed briefly, 1-10 minutes, in deionized water.

The rinsed beads were placed on a steel tray and dried at about 110° C. for about 18 hours.

The dried beads were placed in a porcelain crucible and covered, and heated in an oven at about 400° C. for about four hours.

Table 8 gives the selected amount of Laminaria powder in column 1; the selected amount of Chlorella powder in column 2; and the results of the test in columns 3 and 4.

TABLE 8

Results of various combinations of Laminaria and Chlorella powders.

| Laminaria (g) | Chlorella (g) | Formation | Product |
|---|---|---|---|
| 2 | 2 | Good | Good |
| 1 | 3 | Irregular | Good |

TABLE 8-continued

| Results of various combinations of Laminaria and Chlorella powders. | | | |
|---|---|---|---|
| Laminaria (g) | Chlorella (g) | Formation shape | Product |
| 2 | 3 | Good | Good |

Based upon the beads, the observation of slurry conditions, and how easily the slurry could be pumped, a ratio of 2 grams of Laminaria to 3 grams of Chlorella wash chosen as the amount for preparation of the beads.

EXAMPLE 6

This example demonstrates the effect of heating the dried beads in Example 3 at different temperatures.

For this example, a 2:3 ratio of less than 100 mesh (~149 microns) Laminaria powder to less than 100 mesh (~149 microns) Chlorella powder and 0.30 M NaOH was used.

The beads were formed and dried as described in Example 3. The dried beads were divided into four groups. The first group of beads was placed in a covered crucible and heated for about four hours at about 200° C. The second group of beads was heated in a covered crucible for about four hours at about 300° C., and the third group was heated for about four hours at about 400° C. The fourth group of beads was not heated.

To evaluate the effect of the final heating, the hardness of the final product, the effects of rehydration, and the effect of high temperature and pressure exposure were considered. Table 9 summarizes the results of the tests.

TABLE 9

| Effect of heating beads at various temperatures for about 4 hours. | | |
|---|---|---|
| Product Test | Bead Hardness | Effect of Rehydration |
| Unheated | Very Hard | Smear easily - water discolored |
| 200° C. | Very Hard | Smear easily - water is brown |
| 300° C. | Soft | Smear easily - water is brown |
| 400° C. | Soft | Smear easily - water is clear |

Although, the unheated beads and the beads heated at 200° C. were harder than those heated at the higher temperatures, when the unheated beads and the beads heated at 200° C. were rehydrated, they quickly softened and smeared when finger pressure was applied. The effect of rehydration is important because when the beads are placed in a high temperature aqueous solution they will be effectively rehydrated.

The darkly colored water obtained upon rehydration indicated that much material leached into the water. The sample heated at about 400° C. was not too hard, but the rehydration did not leach material into the water.

To ascertain the effect of the final heating upon high temperature and pressure operation, newly prepared beads were placed in the high temperature bomb assembly as described in Example 10. Beads heated at 200° C. were placed in a first bomb with 5 ml of water and beads heated at 400° C. were placed in a second bomb with 5 ml of water.

Both bombs were heated overnight at 190° C. After the bombs had cooled, they were opened and the beads inspected.

The beads heated at 200° C. were almost decomposed and very few remained intact. The solution was dark brown in color with some solid material present. The beads heated at 400° C. were mostly intact with a few of them being destroyed. The solution showed some brown color but the condition and color indicated much less destruction of material.

Based upon these results 400° C. was selected as the heating temperature for the dried beads.

EXAMPLE 7

This example demonstrates procedures for immobilization of microorganisms using an alkaline solution and algae other than Laminaria japonica. In each of the following procedures, the algae were ground in a blender and sieved to produce a powder of less than 100 mesh (~149 microns). Based upon the previous examples, the algal powder was mixed with a 0.3 M sodium hydroxide solution. The resulting mixture was added dropwise to a 3% calcium chloride solution. The beads formed upon contact with the calcium chloride solution were removed from the solution and washed and dried as described below. The dried beads in each of the following procedures were heated at about 400° C. for about four hours, as previously described, to form the compositions of this invention. Hence, the heating of the beads at an elevated temperature is not included in the following descriptions.

A. *Eisenia bicyclis* (a brown alga)

Dried *Eisenia bicyclis* was ground and sieved to less than 100 mesh (~149 microns) powder. Five grams of less than 100 mesh *Eisenia bicyclis* powder were added to 68 milliliters of 0.3 M sodium hydroxide to form a mixture. The mixture was stirred for one hour to form a homogenous slurry. The slurry was added dropwise into a solution of 3% calcium chloride Good bead formation was observed. The beads were rinsed for five minutes in distilled water and dried overnight (about eighteen hours) at 115° C. The dried beads were hard and typical of beads formed by the method in the previous examples at this stage.

B. *Laminaria longicruris* (a brown alga)

Washed and dried *Laminaria longicruris* was ground in a blender and sieved to less than 100 mesh (~149 microns) powder Five grams of the sieved Laminaria powder were added to 63 milliliters of 0.3 M sodium hydroxide. The resulting mixture was stirred for 75 minutes. Since the slurry was very viscous, an additional 25 milliliters of 0.3 M sodium hydroxide was added to the slurry. The slurry was added dropwise to 3% calcium chloride. Good bead formation was observed. The beads were washed in deionized water for about five minutes and dried at about 120° C. overnight. Again the beads were typical of beads formed at this stage.

C. *Alaria esculenta* (a brown alga)

Washed and dried Alaria was ground in a blender and sieved to less than 100 mesh (~149 microns) powder. Five grams of the Alaria powder were added to 62.5 milliliters of 0.3 M sodium hydroxide and stirred for fifteen minutes. An additional 10 milliliters of 0.3 M sodium hydroxide was added to the mixture and the solution was stirred for an additional 45 minutes to obtain a homogenous slurry. The slurry was added dropwise to a 3% calcium chloride solution. The resulting beads were washed in deionized water for about five minutes and dried overnight at 120° C.

D. *Porphyra yezoensis* (a red alga)

Porphyra was ground in a blender and sieved to less than 100 mesh (∼149 microns) powder. One gram of Porphyra powder was slowly added to 14 milliliters of 0.3 M sodium hydroxide The resulting mixture was stirred for one hour to obtain a homogenous slurry. The slurry was added dropwise to a 3% calcium chloride solution. Good bead formation was observed and the beads were dried at 120° C. overnight. As the beads dried they tended to flatten but the material had a good hard texture.

E. *Euchema spinosum* (a red alga)

Euchema was ground and sieved to a less than 100 mesh (∼149 microns) powder. Five grams of Euchema powder were added to 68 milliliters of 0.3 M sodium hydroxide. The resulting mixture was stirred for 60 minutes to form a homogenous slurry and this slurry was added dropwise into a 3% calcium chloride solution. Again, after washing for five minutes and drying overnight at 120° C. good beads were formed, but the beads tended to flatten and produced a hard, brittle material.

This example demonstrates that in addition to the brown algae which contain alginic acid, red algae which contain carrageenan can be immobilized by mixing a red alga with a sodium hydroxide solution to form a slurry and then contacting the slurry with a calcium containing solution to form insoluble gel beads The compositions of this invention are formed by washing and drying the insoluble gel beads and heating the dried beads at 400° C. for several hours. Thus, according to the principles of this invention, several microorganisms, each microorganism being capable of selectively binding different metal ions, can be added to the slurry formed in any of the above procedures to produce a composition having specifically tailored metal ion-binding characteristics.

EXAMPLE 8

This example illustrates alternative procedures for immobilizing metal ion-binding microorganisms. These procedures are based upon the observation that ground red alga, *Euchema spinosum*, which in one embodiment had been washed with 0.1 M NaOH and dried, dissolved in distilled water coagulated at about a pH of 10.5 when the pH was progressively lowered using $H_2SO_4$. This property of red alga has been used to prepare an insoluble biomass that can be ground and sieved and subsequently used to extract precious metal ions from an aqueous solution.

*Euchema spinosum*, which had been washed with 0.1 M NaOH and dried, was ground and sieved to a less than 100 mesh (∼149 microns) powder. This powder is referred to as alkaline treated *Euchema spinosum* powder. Thirty grams of less than 100 mesh (∼149 microns) alkaline treated *Euchema spinosum* powder were slowly added to 600 ml of distilled water. The mixture was stirred for about one hour to form a homogeneous slurry.

After the one hour stirring, the Euchema slurry was pumped at a flow rate of about 10 ml/min sequentially into three beakers The first beaker contained 400 ml of 0.5 M $H_2SO_4$, the second contained 400 ml of 0.5 M HCl and the third beaker contained 400 ml of 0.5 m HCl and 3% $CaCl_2.2H_2O$. An insoluble coagulated biomass formed in each of the beakers.

The insoluble coagulated biomass in each of the beakers was recovered by draining the beaker through a 100 mesh (∼149 micron) sieve. The collected biomasses were dried overnight in an oven at a temperature of about 125° C.

While this procedure did not result in the formation of beads, each of the compositions had a black charred consistency similar to the consistency of the beads obtained in Examples 1–3.

Since no bead formation was achieved upon contacting the Euchema slurry with either the acids or the acid-calcium chloride solution, another procedure was developed to form the preferred bead structure. In this procedure, 2.5 grams of less than 100 mesh (−149 microns), alkaline treated *Euchema spinosum* powder, a red alga, and 1.5 grams of less than 100 mesh (−149 microns), *Spirulina platensis* powder, a blue-green alga, were mixed with 50 ml of distilled water. The mixture was stirred for about one hour to form a homogenous slurry.

This slurry was pumped at a flow rate of about 10 ml/min and sequentially added dropwise to two beakers. The first beaker contained 60 ml of 0.5 M HCl and the second contained 60 ml of 0.5 M HCl and 3% $CaCl_2.2H_2O$.

When the drops contacted the hydrochloric acid, beads having a diameter of about 0.5 cm were formed and these beads sank very rapidly to the bottom of the beaker so that further bead formation was not impeded. When the drops contacted the hydrochloric acid-calcium chloride solution, beads were also formed, but these beads tended to stay on the surface of the solution and float.

To form the compositions of this invention, the beads were recovered from the beakers; washed briefly; dried overnight (about eighteen hours) at about 120–125° C.; and heated at about 400° C. for about 4 hours.

This example shows that in addition to the immobilization techniques in Examples 1–3, which utilized sodium hydroxide to form the slurry that was subsequently added to a calcium containing solution, an alga containing carrageenan can be immobilized by contacting an aqueous slurry containing the alga with an acid. Further, other metal binding materials, such as a blue-green alga, can be added to the slurry to form not only beads but also a composition having selected metal ion-binding characteristics.

EXAMPLE 9

This example demonstrates the immobilization of metal ion-binding microorganisms other than algae in insoluble metallic gel beads according to the principles of Example 3.

Two grams of less than 100 mesh (−149 microns) Laminaria powder were slowly added with stirring to 50 ml of 0.30 M NaOH. The Laminaria powder was added to the sodium hydroxide so that no clumps were formed.

The Laminaria-NaOH mixture was stirred for about sixty minutes After the one hour stirring, 3 grams of less than 100 mesh (−149 microns) *Saccharomyces cerevisiae* (Baker's yeast) powder was very slowly added to the Laminaria-NaOH mixture with stirring. The resulting mixture was stirred for sixty minutes to form a homogeneous *Laminaria-Saccharomyces* slurry.

The *Laminaria-Saccharomyces* slurry was extruded through a twenty gauge (812.8 microns) needle into an unstirred 3% calcium chloride solution. As the slurry stream hit the surface of the calcium chloride solution, the stream broke into numerous beads of various sizes, ranging from 1-3 mm diameter. The beads settled to the bottom of the calcium chloride solution The insoluble beads were removed from the calcium chloride solution, rinsed briefly, 1-10 minutes in deionized water and placed on a steel tray. All excess water was removed from the steel tray.

The steel tray was placed in an oven, and the beads were dried overnight (about 18 hours) at a temperature of about 125° C. The dried beads were then placed in a porcelain crucible, covered and heated for about four hours at about 400° C.

The final composition consisted of small beads which were comparable to the beads formed in Example 3. This example demonstrates the immobilization of metal ion-binding microorganisms other than algae according to the principles of this invention as set forth in Example 3.

EXAMPLE 10

This example demonstrates binding of a precious metal, gold, in an aqueous solution at high temperature and high pressure to Laminaria-Chlorella beads prepared as in Example 3, and recovery of the bound gold.

For the high temperature and high pressure tests in this example and in the other examples, the experiments were conducted using commercially available Parr bombs, which can be heated to high temperatures. A teflon lined cup was used in the bomb because control experiments indicated that gold binds to stainless steel but not to teflon.

Figure 4A:
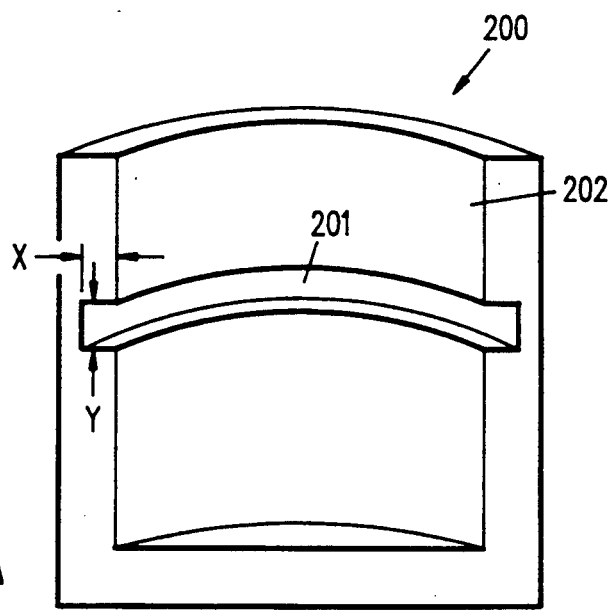
FIGS. 4A and 4B illustrate modifications to a teflon-lined bomb used to demonstrate the metal ion binding capability of the compositions of this invention at elevated temperatures and pressures.
Figure 4B:

The cup in the bomb was modified as shown in the cross-sectional view of cup 200 in FIG. 4A. A groove approximately 0.25 inches (x) deep and approximately 0.10 inches thick (y) was machined into inner wall 202. A 40 mesh (~420 microns) teflon screen 210 (FIG. 4B) was sandwiched between two teflon snap rings 211, 212 which were inserted into machined groove 201 so that teflon screen 210 was stretched across the inner diameter of cup 200.

For the binding experiments, 5 ml of gold containing solution were placed in the teflon cup. Then the teflon rings and the teflon screen were placed in the cup as described above. The beads to be tested, 0.100 grams, were placed on top of the screen. The teflon cup was closed and then placed in a commercially available Parr #4749 acid digestion bomb. The bomb was assembled, sealed and placed in a furnace at about 190° C. for about four hours.

At the end of the four hours, the bomb was inverted and shaken, allowing solution in the cup bottom to come in contact with the beads on top of the screen. The inverted bomb, with the solution in contact with the beads, was put back into the oven and left in the oven for the desired amount of time, usually overnight. At the end of the desired time period the bomb was removed from the furnace, turned upright, allowing the test solution to return to the bottom of the teflon cup and removing the test solution from contact with the beads.

After the bomb assembly was cooled, it was opened. After the beads had been removed and the screen and rings removed, the liquid remaining in the cup was analyzed for the presence of gold, using a graphite furnace atomic absorption spectrometer. Since control experiments demonstrated that no gold was bound on the teflon cup, any gold which was not present in the liquid was bound to the beads Accordingly, this procedure determined the percentage of the gold which was bound to the beads.

In a first test using the above method, *Laminaria-Chlorella* beads were sieved over a 40 mesh (−420 microns) sieve to remove the smallest beads. Geothermal water, which had previously been filtered through a 0.2 micrometer ultrafilter, was spiked to 100 ppb of gold using $HAuCl_4$ and placed in the cup. The graphite furnace atomic absorption spectrometer analysis, after the procedure was conducted as described above, indicated that no gold was present in the liquid remaining in the cup.

In addition to this test, several additional gold binding experiments were performed to provide beads having bound gold for use in experiments designed to demonstrate the recovery of gold from the beads. In all the tests, the gold binding to the Laminaria-Chlorella beads ranged from 80 to 100% as was determined by the graphite furnace measurements on the solution in the bomb after the test. As discussed above, in view of experimental errors, effectively 100% of the gold was bound to the beads.

Nine different procedures were used to recover the gold bound to the Laminaria-Chlorella beads. In each of the procedures, a distinct group of beads containing bound gold was used.

1. The beads bound with gold were placed in a new polystyrene test tube and cap, 10 ml capacity, with 3 milliliters of 0.2% NaCN. The tube was swept for several minutes with $O_2$ and sealed. The sealed tube was rocked overnight at room temperature in a Miles Scientific Model 4651 Aliquot mixer. After being rocked overnight, the beads were allowed to settle and the supernatant withdrawn and analyzed for Au by graphite furnace atomic absorption. This procedure gave an average recovery of approximately 27%.

2. The beads having the bound gold were placed in a new polystyrene test tube and cap assembly, 10 ml capacity, with 3 milliliters of 0.10 M thiourea at a pH of 2. The contents were rocked overnight at room temperature in a Miles Scientific Model 4651 Aliquot Mixer. The beads were allowed to settle and the supernatant withdrawn and analyzed for presence of gold by graphite furnace atomic absorption. No significant amounts of gold were recovered with this procedure.

3. The beads having the bound gold were transferred to a teflon cup and lid from the Parr #4749 acid digestion bomb. Five milliliters of 0.5% NaCN in 0.5 M NaOH were added to the cup and the cup assembly was sealed within the digestion bomb and heated overnight, approximately 18 hours, at about 190° C. The presence of the 0.5 M NaOH prevented an accurate analysis of gold in the sample, but it was possible to determine that no significant amounts of gold were extracted.

4. The beads having the bound gold were transferred to the teflon cup and lid assembly from a Parr #4749 acid digestion bomb. Five milliliters of a 0.5% NaCN in 0.5 M NaOH were added to the cup. The cup assembly was sealed within the digestion bomb and the bomb was heated in a water bath at about 85-90° C. for about two hours. At the end of the two hours, the contents of the cup were centrifuged, while still hot, to remove the beads from the 0.5% NaCN in 0.5 NaOH solution. Graphite furnace atomic absorption analysis was troubled by high background values and an accurate determination of the gold extracted by the process was not possible. It was possible however to detect the presence of a significant amount of gold.

5. The beads having the bound gold were transferred to the teflon cup and lid assembly from the Parr #4749 acid digestion bomb. Five milliliters of 0.2% NaCN in distilled water were added to the cup and the cup was sealed in the bomb and heated for about two hours at about 85°-90° C. At the end of two hours, the contents were centrifuged, while still hot, to remove the beads from the 0.2% NaCN in distilled water. Graphite furnace atomic absorption analysis indicated that approximately 60% of the bound gold was recovered.

6. The beads having the bound gold were transferred to the teflon cup and lid assembly from the Parr #4749 acid digestion bomb. Five milliliters of 0.5% NaCN in distilled water were added to the cup. The beads, sealed in the bomb, were heated in this solution for five hours at 85-90° C. At the end of five hours, the contents were removed and centrifuged, while still hot, to remove the beads from the 0.5% NaCN in distilled water. Analysis by graphite furnace atomic absorption indicated the presence of gold and a final recovery of approximately 69% was obtained.

7. The beads having the bound gold were transferred to the teflon cup and lid assembly from the Parr #4749 acid digestion bomb. Five milliliters of 0.5% NaCN in a 20% ethanol solution were added to the cup. The cup was sealed in the bomb and the bomb was heated for about five hours at about 85-90° C. temperature. At the end of five hours, the contents were removed and centrifuged, while still hot, to remove the beads from the 0.5% NaCN in a 20% ethanol solution. Analysis by graphite furnace atomic absorption indicated that approximately 48% of the bound gold was recovered.

8. In this procedure, the beads were first treated with a solution of 2% HCl before being exposed to the aqueous solution containing dissolved gold. Five grams of beads were placed in a glass column, and a solution of 2% HCl was pumped in a recirculating fashion for nine hours through the glass column. After nine hours, the 2% HCl was replaced by distilled water and the pumping was continued for several hours. After being treated with distilled water, the beads were removed from the glass column and dried for 5 hours at 130° C. The beads were then exposed to a gold containing solution in a binding experiment, the conditions of which have been previously described. The graphite furnace atomic absorption analysis of the solution remaining in the cup after reaction was much improved because the background levels were significantly reduced. The results indicated that 90% of the gold was bound to the beads.

The beads having the bound gold were transferred to the teflon cup and lid assembly from a Parr #4749 acid digestion bomb Five milliliters of 0.5% NaCN were added to the cup and the contents were sealed in the bomb and heated at about 85-90° C., for about five hours. At the end of five hours, the contents were centrifuged, while still hot, to remove the beads from the 0.5% NaCN. Graphite furnace atomic absorption analysis of the extract indicated 62% of the bound gold had been recovered.

9. The beads having the bound gold were first oven dried for about two hours at about 100° C. At the end of two hours, the beads were transferred to the teflon cup and lid assembly from a Parr #4749 acid digestion bomb. To this assembly was added 5 ml of 0.5% NaCN and the contents sealed in the bomb and heated for 5 hours at 85-90° C. At the end of 5 hours, the contents were removed and centrifuged, while still hot, to remove the beads from the 0.5% NaCN. Analysis of the extract by graphite furnace atomic absorption indicated recovery of 79% of the bound gold.

EXAMPLE 11

This example demonstrates the binding of silver in an aqueous solution at high temperature and high pressure to Laminaria-Chlorella beads prepared as in Example 3, and subsequent recovery of the bound silver.

The modified Parr bomb, described in Example 10, was used for this example.

For the binding experiments, 5 ml of a solution containing 2.54 ppm silver (derived from silver nitrate) in distilled water was placed in the teflon cup. Then the teflon rings and the teflon screen was placed in the cup as described above. The Laminaria-Chlorella beads were sieved over a 40 mesh (~420 microns) sieve to remove the smallest beads and 0.100 grams of Laminaria-Chlorella beads were placed on top of the screen. The teflon cup was then placed in a commercially available Parr bomb. The bomb was assembled, sealed and placed in a furnace at about 190° C. for about four hours. At the end of the four hours, the bomb was inverted and shaken, allowing solution in the cup bottom to come in contact with the beads on top of the screen. The inverted bomb was put back into the oven with the solution in contact with the beads and left in the oven overnight, about 18 hours. At the end of the time period, the bomb was removed from the furnace, turned upright, allowing the solution to return to the bottom of the teflon cup and removing the solution from contact with the beads.

After the bomb assembly cooled, it was opened and the beads, the screen, and rings removed. The liquid remaining in the cup was analyzed, using a flame atomic absorption spectrometer, for the presence of silver. Since control experiments demonstrated that no silver was bound on the teflon cup, any silver which was not present in the liquid was assumed bound to the beads. Accordingly, this technique determined the percentage of the silver which was bound to the beads. Only 0.07 ppm of silver was left in the aqueous solution indicating that more than 97% of the silver was bound to the beads at about 190° C. temperature, a high temperature.

To recover the silver bound to the *Laminaria-Chlorella* beads, the beads were digested overnight (about 18 hours) with 5 ml 0.5% NaCN at about 85-95° C. Analysis of the extracts using flame atomic absorption and standard addition analysis indicated the presence of 2.6 ppm of silver. Hence, this method resulted in essentially complete recovery of the bound silver.

In another silver binding experiment, the 5 ml of distilled water spiked with 2.54 ppm of silver was replaced with a solution saturated (at room temperature) with sodium chloride, approximately 250,000 ppm, and spiked with 2.54 ppm of silver. The binding test was performed identically to that described above for the silver in distilled water. After the binding test was completed, the high NaCl concentration made analysis of the remaining solution impossible.

However, the beads were extracted in the same manner as described above using 0.5% NaCN and the extract showed the presence of 2.0 ppm of silver. Therefore, the extraction and recovery in the presence of the sodium chloride was at least 80% effective.

EXAMPLE 12

This example demonstrates the binding of platinum in an aqueous solution at high temperature and high pressure to Laminaria-Chlorella beads prepared as in Example 3, and the recovery of the bound platinum.

The modified Parr bomb, described in Example 10, was used for this example.

For the binding experiments, 5 ml of distilled water spiked to a level of 50 ppb of Pt as $PtCl_4$ were placed in the teflon cup. Then, the teflon rings and the teflon screen were placed in the cup as described above. The Laminaria-Chlorella beads were sieved over a 40 mesh ($\sim$420 microns) sieve to remove the smallest beads and 0.100 grams of Laminaria-Chlorella beads were placed on top of the screen. The teflon cup was then placed in a commercially available Parr bomb.

The bomb was assembled, sealed and placed in a furnace at 190° C. for four hours. At the end of the four hours, the bomb was inverted and shaken, allowing solution in the cup bottom to come in contact with the beads on top of the screen The inverted bomb was put back into the oven with the solution in contact with the beads and left in the oven overnight, about 18 hours. At the end of the time period, the bomb was removed from the furnace, turned upright, allowing the solution to return to the bottom of the teflon cup and removing the solution from contact with the beads.

After the bomb assembly was cooled, it was opened and the beads, the screen, and rings removed. The liquid remaining in the cup was analyzed, using a graphite furnace atomic absorption spectrometer, for the presence of platinum Since control experiments demonstrated that no platinum was bound on the teflon cup, any platinum which was not present in the liquid was bound to the beads. Accordingly, this technique determined the percentage of the platinum which was bound to the beads. The analysis indicated that 100% of the platinum was bound to the beads at the high temperature.

To recover the platinum bound to the beads, the beads were extracted with 5 ml of 0.5% NaCN for about 18 hours at about 85-90° C. This extraction recovered 25% of the bound platinum Accordingly the material was re-extracted with another 5 ml of 0.5% NaCN at 190° C. in the Parr bomb for 18 hours. No additional platinum was recovered.

Two additional binding procedures were performed, as described above, and two alternative methods for recovery of the bound platinum were investigated. In the first, the bound platinum was extracted using 5 ml of the 0.1 M thiourea at pH 2 at about 85-90° C. for about 18 hours. This method was ineffective in recovery of the bound platinum.

In another extraction procedure, boiling aqua regia digestion for about 3.5 hours recovered platinum ranging from 63% to 100%. The variation in recovery depended on the validity of the analysis and controls. The samples from the extraction were difficult to analyze because of high background levels introduced by the materials solubilized by the aqua regia digest. The variation is assumed to be caused by matrix interferences of calcium and sodium which results in high background for the graphite furnace atomic absorption analysis. Also, cellular material is extracted with aqua regia and the material adds to matrix interference However, the beads were not visibly affected in volume, shape or appearance by the aqua regia digest.

In another binding extraction procedure, Laminaria-Chlorella beads were contacted at about 190° C. with 5 ml of a saturated (at room temperature) NaCl ($\sim$25% salt) solution spiked to a level of 100 ppb platinum with $PtCl_4$ and the test carried out as described above.

Analysis of the supernatant, after bomb testing, was impossible because of the high sodium chloride concentrations Boiling aqua regia digestion of the beads for about 3.5 hours extracted at least 21% of the platinum. Based upon the binding experiments for other precious metals, this result suggests that a significant portion of the platinum was extracted from the solution.

EXAMPLE 13

This example demonstrates the binding of cadmium in an aqueous solution at ambient temperatures to Laminaria-Chlorella beads, prepared as in Example 3, and the recovery of the bound cadmium.

A ground water sample from a Superfund site was obtained that contained cadmium at 130 ppb and the other dissolved materials as shown in Table 6. A small column having a volume of 5 ml was charged with 1.5 grams of *Laminaria-Chlorella* beads. Five hundred milliliters (100-bed volumes) of the cadmium containing solution were passed through the column and fractions of the effluent were collected.

A graphite furnace atomic absorption analysis of the effluent showed that the cadmium content in the effluent fractions was near 1 ppb after 100 bed volumes. After the 100 bed volumes of the cadmium containing solution were passed through the column, the column was eluted with 0.3 N $H_2SO_4$. Essentially, all of the bound cadmium was recovered in the first five bed volumes stripped with the sulfuric acid.

EXAMPLE 14

This example demonstrates the binding of gold, as gold cyanide, in an aqueous solution at ambient temperatures to alginate-Chlorella beads, prepared as in Example 1, and the recovery of the bound gold.

A solution of $1.0 \times 10^{-4}$ M (19.7 ppm Au) $KAu(CN)_2$ was passed through a column, as described in Example 13, which had been charged with alginate-Chlorella beads. A total of 90 bed volumes of the gold containing solution was passed through the column. A flame atomic absorption analysis of the effluents from the column indicated that the binding of the gold was more than 99% complete.

After the passage of the 90 bed volumes of the gold cyanide solution through the column, the column was stripped by the passage of 10 bed volumes of 1 M NaOH. Over 80% of the recovered gold was found in the first five bed volumes of NaOH eluate.

EXAMPLE 15

This example demonstrates the binding of gold, as gold cyanide, in an aqueous solution at ambient temperatures to Laminaria-Chlorella beads, prepared as in Example 3, and the recovery of the bound gold.

Three proprietary gold-containing electroplating solutions, A, B and C, were obtained. Each of these solutions contained gold in the form potassium gold cyanide ($KAu(CN)_2$). Solutions A and B were samples of acid gold cyanide and neutral gold cyanide plating solutions respectively. Solution C, obtained from a supplier different from the supplier of Solution A, was another acid gold cyanide plating solution Any solution containing gold ions and other dissolved materials could be used in this example. Three different electroplating solutions were obtained to assess the metal ion binding performance in the presence of various dissolved materials.

Solutions A, B and C were each diluted with distilled water to a concentration of 10 ppm gold to simulate industrial rinse solutions. Each solution was then adjusted to pH 3 with sulfuric acid. The gold cyanide complex is still stable at pH 3, but adjustments to lower pH values tend to promote dissociation of cyanide from the complex and result in the generation of toxic HCN gas. Gold cyanide binding was observed to occur at pH values between 7.5 and 3. However, the affinity of the immobilized algae beads for gold was much higher as the pH approached 3.

The Laminaria-Chlorella beads were soaked overnight in 2% HCl. The beads were packed into a column (0.7 cm I.D.×13 cm high) so that the total bed volume was about 5 ml. The column was then flushed sequentially, at a flow rate of one-sixth bed volume per minute (0.8 ml/min) with 50 ml of 2 percent HCl, with 25 ml distilled water (to remove the HCl), with 25 ml of 0.10 M sodium citrate at pH 3 (to buffer water.

Diluted Solution A (10 ppm Au) was pumped through the column at a flow rate of one-sixth of a bed volume per minute (0.8 ml/min). A total of 152 bed volumes (260 ml) were pumped through the column, and 10 ml fractions of the column effluent were collected for analysis. Analysis of the column effluent fractions by atomic absorption showed that gold concentration in the effluent fractions gradually increased from 0 (detection limit of 0.05 ppm without graphite furnace) up to 0.7 ppm at the 152 bed volume fraction Thus, after elution of 152 bed volumes of the gold-containing solution the retention of gold was still at the 93 percent level.

After passage of 152 bed volumes of diluted Solution A, the column was stripped of the bound gold by the passage of 0.5 percent sodium cyanide through the column at a flow rate of one-sixth of a bed volume per minute. Stripping of all bound gold was complete within passage of about 14 bed volumes of the sodium cyanide. The stripped solutions were dark in color indicating that some colored material was being removed from the beads along with the gold.

Diluted Solution B was pumped through a new column containing Laminaria-Chlorella beads, prepared as described above. The column size, flow rate and collected fraction volumes of the effluent were the same as described for diluted Solution A. A total of 502 bed volumes (2510 ml) of diluted Solution B was passed through the column. Analysis of the effluent fractions indicated that the gold concentration gradually increased from 0 (0.05 ppm is detection limit in absence of graphite furnace) to 1.8 ppm at the 502 bed volume fraction. This indicates that after 502 bed volumes, the beads were still removing 82 percent of the gold in the aqueous solution.

After passage of 502 bed volumes of diluted Solution B, the bound gold was stripped from the column as previously described for diluted Solution A using sodium cyanide. Essentially 100 percent of the bound gold was recovered in about 22 bed volumes of NaCN solution, although as with the stripping of Solution A, the stripped fractions had a dark brown color.

Diluted Solution C was pumped through a new column containing Laminaria-Chlorella beads, prepared as described above. The column size, flow rate and collected fraction volumes of the effluent were the same as described for Solution A. A total of 198 bed volumes (990 ml) of diluted Solution C (10 ppm Au) was passed through the column. Analysis of the effluent fractions indicated that the gold concentration gradually increased from 0 (0.05 ppm is the detection limit in the absence of graphite furnace) to 1.31 ppm in the 198 bed volume fraction, (See FIG. 5, Cycle #1) indicating that 87 percent of the gold in the aqueous solution was still being retained by the beads.

After passage of 198-bed volumes of diluted Solution C through the column, the bound gold was stripped using 0.10 M sodium hydroxide. (See FIG. 6, Cycle #1.) The sodium hydroxide was passed through the column at the rate of one-sixth of a bed volume per minute (0.8 ml/min), and 10 ml fractions of the eluate were collected. Essentially 100 percent of the bound gold was stripped with the NaOH. Most of the bound gold was stripped with the passage of 4-bed volumes of NaOH and all of the bound gold was stripped within 8-bed volumes of NaOH. Much better stripping of gold was observed with the sodium hydroxide as opposed to the sodium cyanide The stripped fractions were still very dark in color, however.

To determine whether the material causing the dark color in the eluate could be washed away, the column which had been used to bind the gold from diluted Solution C was washed by the passage of about an additional 200-bed volumes of 0.1 M NaOH through the column at a flow rate of about one-sixth bed volume per minute (sodium hydroxide washing) The resulting eluate was darkly colored, but not as dark as the original effluent from stripping the bound gold The volume of the beads packed in the column was not visibly affected by the alkaline solution, sodium hydroxide, washing. After elution with NaOH, an alkaline solution, the column was prepared for additional gold binding by washing sequentially, with 50 ml of distilled water, 25 ml of 0.1 M sodium citrate buffer at pH 3, followed by 25 ml of distilled water (column preparation washing). The column preparation washing also did not visibly affect the volume of the beads.

Diluted Solution C at pH 3 was then passed through the column at a flow rate of one-sixth bed volume per minute and two bed volume fractions were collected. After passage of 396-bed volumes of diluted Solution C (10 ppm Au) through the column, analysis showed that only 1.2 ppm of gold was in the last effluent fraction (see FIG. 5, Cycle #2), indicating that 88 percent of the gold was still being retained Thus, after the sodium hydroxide washing, the column performed twice as well in removing gold ions from an aqueous solution as the column did prior to the sodium hydroxide washing (198-bed volumes vs. 396 bed volumes).

After passage of diluted Solution C was stopped, the bound gold was again eluted off the column using 0.1 M NaOH. (See FIG. 6, Cycle #2.) As before, most of the bound gold was recovered within the first 4-bed volumes of NaOH, and essentially all of the bound gold was recovered with the first 8-bed volumes of NaOH. The stripped fractions were light brown in color indicating that much less material (other than gold) was being leached with the sodium hydroxide.

Figure 5:
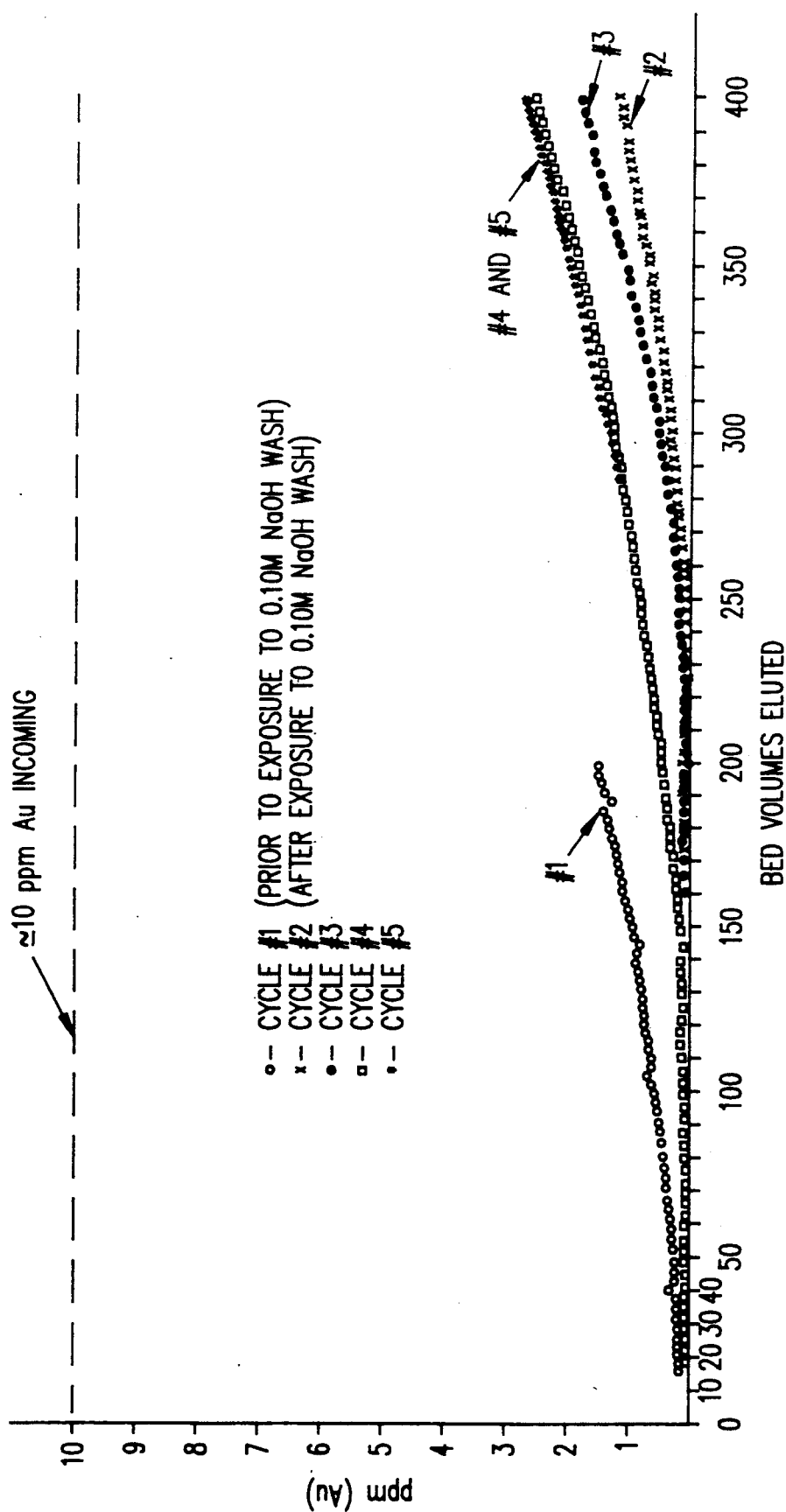
FIG. 5 illustrates five gold adsorption cycles for a composition formed according to the principles of this invention.
Figure 6:
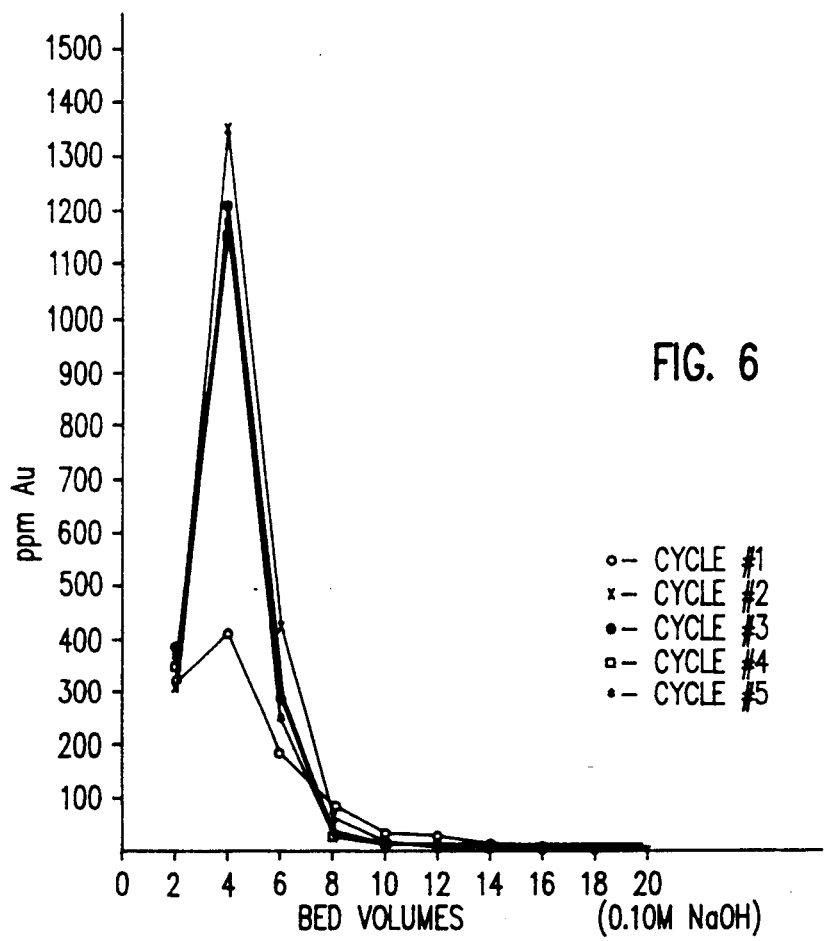
FIG. 6 illustrates five gold stripping cycles corresponding to the adsorption cycles of FIG. 5.

The steps consisting of 1) column preparation washing; 2) loading gold from diluted Solution C on the column; and 3) stripping the bound gold with NaOH were repeated three more times (FIGS. 5 and 6, Cycles #3-5). The performance of the beads in the column was essentially the same for each additional cycle, and the bound gold was stripped from the column equally well with 0.1 M NaOH each time. Further, the volume of the beads in the column was not visibly changed.

Figure 8:
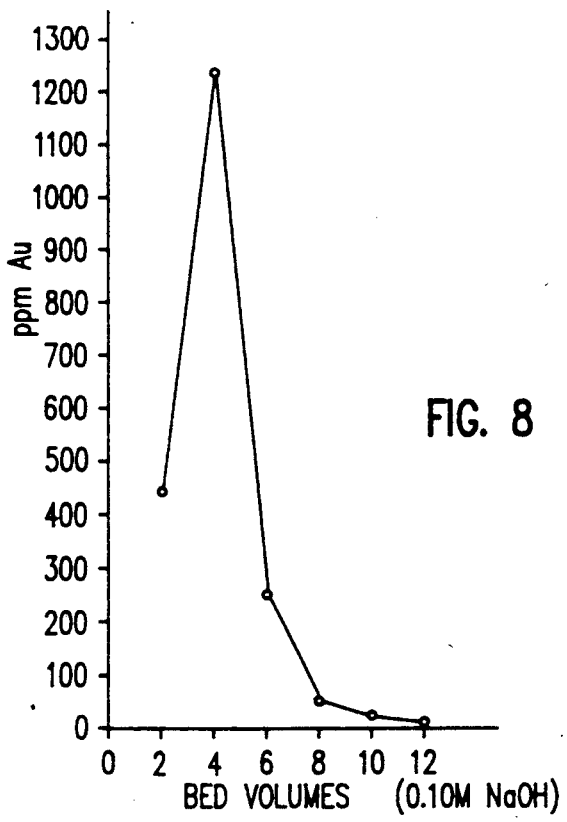
FIG. 8 illustrates a sixth gold stripping cycle corresponding to the adsorption cycle of FIG. 7.
Figure 7:
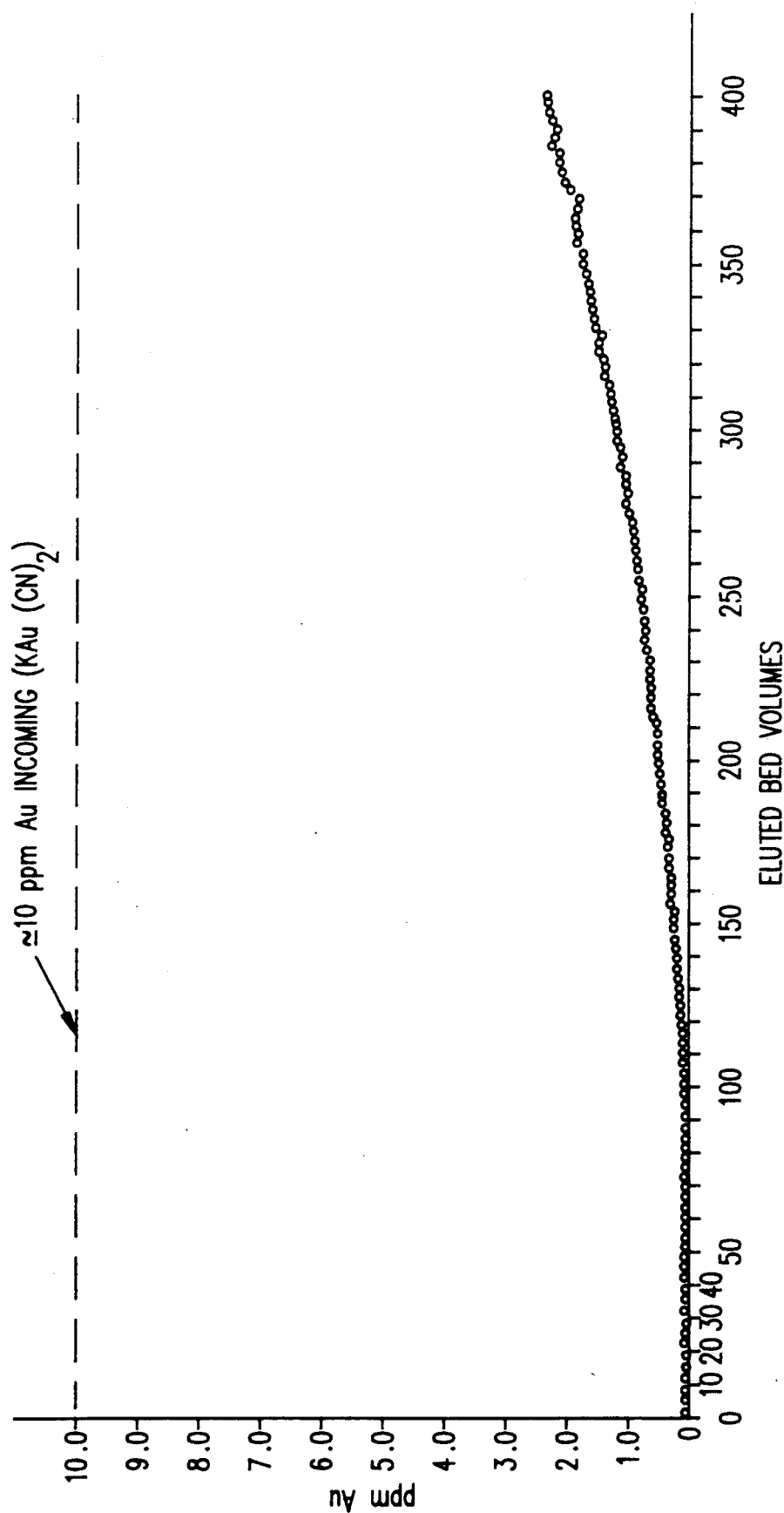
FIG. 7 illustrates a sixth gold adsorption cycle for the composition used in the cycles of FIG. 5.

After the fifth cycle using diluted Solution C, an aqueous solution containing 10 ppm of gold derived from KAu(CN)$_2$ was prepared. After a column preparation washing, the column was loaded a sixth time using this aqueous solution (FIG. 7) and subsequently stripped using 0.1 M NaOH (FIG. 8). By the time the fifth and sixth strippings with sodium hydroxide had occurred, the stripped fractions had a very pale straw yellow color.

These experiments suggest that a thorough washing of the beads prior to column use (1) improves the performance of the column with respect to gold binding, and (2) removes dark pigments which color the stripping fractions. Moreover, the washing does not visibly affect the volume of the beads and unlike prior art silica compositions, the beads do not hydrolyze when exposed to an alkaline solution.

EXAMPLE 6

This example demonstrates the binding of arsenic in an aqueous solution at ambient temperature to Laminaria-Chlorella beads, prepared as in Example 3 at pH values between 7 and 10.

The Laminaria-Chlorella beads, at a concentration of 6.7 mg/ml, were added to a solution initially containing 6 ppm As as $AsO_4^{-3}$ at pH 9. After stirring the solution for one hour, the beads were removed. Graphite furnace atomic absorption analysis of the remaining solution showed that arsenic adsorption on the beads was better than 90%.

EXAMPLE 17

This example demonstrates the binding of nickel in an aqueous solution at ambient temperature to Laminaria-Chlorella beads, prepared as in Example 3, and to alginate-Chlorella beads, prepared as in Example 1, and the recovery of the bound nickel from the beads.

A ground water sample contaminated with 2.68 ppm nickel (see Table 5) at pH 7.2 was passed through a column containing 1.5 grams of alginate-Chlorella beads. Analysis of the effluent from the column showed that the nickel was removed to a level of 0.2-0.3 ppm through the passage of 50 bed volumes through the column. Nickel concentrations of the effluent gradually increased to 0.45 ppm after 85 bed volumes were passed through the column.

The alginate-Chlorella beads were stripped of the nickel by the elution of ten bed volumes of 10% HCl. Analysis showed complete stripping of nickel with a majority of the nickel being stripped in the first five bed volumes.

The nickel containing ground water was also passed through a column packed with 1.5 grams of Laminaria-Chlorella beads, prepared as in Example 3. After passage of 165 bed volumes of the contaminated solution through the column, the effluent showed 0.45 ppm of nickel.

The Laminaria-Chlorella beads were stripped of nickel with 10% hydrochloric acid and all of the nickel was recovered in the first four bed volumes of the stripping eluent.

EXAMPLE 18

This example demonstrates the binding of copper in an aqueous solution at ambient temperature to Laminaria-Chlorella beads, prepared as in Example 3.

Laminaria-Chlorella beads at a concentration of 50 mg/ml were added to a solution containing 100 ppm copper, 6.5 ml/l of concentrated NH$_4$OH and 2.2 g/l of NH$_4$Cl. After 22 hours of contact between the solution and the beads, the beads were removed and the solution was analyzed for copper content using flame atomic absorption. The analysis of the solution indicated that more than 96% of the copper was adsorbed by the beads.

We claim:

1. A method for removing metal ions from an aqueous medium containing gone or more metal ions in solution comprising:
   contacting the aqueous medium with a composition having immobilized microorganisms capable of binding metal ions wherein the composition is prepared by heating an insoluble material having said immobilized microorganisms at an elevated temperature in the range of about 300° C. to about 500° C., and for a selected period of time
   maintaining the contact for a period of time, sufficient to permit binding of at least one of the metal ions in the aqueous medium to the microorganisms immuobilized in the composition.

2. The method of claim 1 further comprising the step of recovering the metal ions bound to the immobilized microorganisms in said composition.

3. The method of claim 2 wherein the step of recovering the bound metal ions comprises contacting the composition containing the bound metal ions with an eluting solution 4. The method of claim 1 wherein the immobilized microorganisms comprise microorganisms of at least one algal species 5. The method of claim 4 wherein the at least one algal species comprises a brown alga.

6. The method of claim 5 wherein the brown alga is selected from the algal division, Phaeophycrophyta.

7. The method of claim 6 wherein the brown alga is selected from the group consisting of Laminaria sp., Eisenia sp and Alaria sp.

8. The method of claim 7 wherein the alga is Laminaria sp.

9. The method of claim 7 wherein the alga is Eisenia sp.

10. The method of claim 7 wherein the alga is Alaria sp.

11. The method of claim 4 wherein the at least one algal species comprises a green alga.

12. The method of claim 11 wherein the green alga is Chlorella sp.

13. The method of claim 4 wherein the at least one algal species comprises a blue-green alga.

14. The method of claim 13 wherein the blue-green alga is Spirulina sp.

15. The method of claim 4 wherein the at least one algal species comprises a red alga.

16. The method of claim 15 above wherein the red alga is selected from the algal division, Rhodophycophyta.

17. The method of claim 16 wherein the red alga is selected from the group consisting of Euchema sp. and Porphyra sp.

18. The method of claim 17 wherein the red alga is Euchema sp.

19. The method of claim 17 wherein the red alga is Porphyra sp.

20. The method of claim 4 wherein the at least one algal species is Cyanidium sp.

21. The method of claim 1 wherein the immobilized microorganisms comprise microorganisms of two or more algal species.

22. The method of claim 21 wherein the two or more algal species include a brown alga.

23. The method of claim 22 wherein the brown alga is selected from the algal division, Phaeophycrophyta.

24. The method of claim 23 wherein the brown alga is selected from the group consisting of Laminaria sp., Eisenia sp. and Alaria sp.

25. The method of claim 24 wherein the alga is Laminaria sp.

26. The method of claim 24 wherein the alga is Eisenia sp.

27. The method of claim 24 wherein the alga is Alaria sp.

28. The method of claim 21 wherein the two or more algal species include a green alga.

29. The method of claim 28 wherein the green alga is Chlorella sp.

30. The method of claim 21 wherein the two or more algal species comprises a blue-green alga.

31. The method of claim 30 wherein the blue-green alga is Spirulina sp.

32. The method of claim 21 wherein the two or more algal species include a red alga.

33. The method of claim 32 wherein the red alga is selected from the algal division, Rhodophycophyta.

34. The method of claim 33 wherein the red alga is selected from the group consisting of Euchema sp. and Porphyra sp.

35. The method of claim 34 wherein the red alga is Euchema sp.

36. The method of claim 34 wherein the red alga is Porphyra sp.

37. The method of claim 21 wherein the two or more algal species include Cyanidium sp.

38. The method of claim 2 wherein the bound metal ions comprise precious metal ions.

39. The method of claim 38 wherein the aqueous medium is a geothermal fluid having a geothermal temperature and pressure and the contacting of the aqueous medium and said composition is performed at about said geothermal temperature and pressure.

40. The method of claim 39 wherein the step of recovering the bound precious metal ions comprises contacting the composition containing the bound precious metal ions with an eluting solution.

41. The method of claim 40 wherein the eluting solution comprises a complexing agent.

42. The method of claim 41 wherein the complexing agent comprises a cyanide containing agent.

43. The method of claim 42 wherein the cyanide containing agent is sodium cyanide.

44. The method of claim 39 wherein the step of recovering the bound precious metal ions comprises burning the composition.

45. The method of claim 3 wherein the bound metal ions comprise hard metal ions and the eluting solution comprises an acidic solution.

46. The method of claim 3 wherein the bound metal ions comprise intermediate metal ions and the eluting solution comprises an acidic solution.

47. The method of claim 3 wherein the bound metal ions comprise soft metal ions and the eluting solution includes a complexing agent.

48. The method of claim 3 further comprising the step of washing the composition with an alkaline solution.

49. The method of claim 48 wherein the alkaline solution comprises an alkaline solution with a hydroxide concentration of about 0.1 M or greater.

50. The method of claim 48 wherein the aqueous medium has a given pH and further comprising the step of washing the composition with a buffer having the given pH after the alkaline solution washing.

51. The method of claim 1 wherein the elevated temperature is about 400° C.

52. The method of claim 1 wherein the insoluble material containing metal ion-binding microorganisms is formed in a process including the steps of:
   i) combining powder of a metal ion-binding microorganism and an alkaline solution to form a homogeneous mixture; and
   ii) contacting the mixture with a metal-containing solution to form an insoluble material containing said immobilized metal ion-binding microorganisms.

53. The method of claim 52 wherein formation of the insoluble material containing immobilized metal ion-binding microorganism further comprises the step of washing the insoluble material prior to exposing the insoluble material to said elevated temperature for the selected period of time.

54. The method of claim 53 wherein formation of the insoluble material containing immobilized metal ion-binding microorganisms further comprises the step of drying the washed insoluble material for a selected period of time to form the insoluble material that is exposed to said elevated temperature.

55. A method for immobilization of metal ion-binding algae comprising the steps of:
   forming an alkaline treated powdered metal ion-binding alga by washing alga in an alkaline solution, drying the washed alga, and powdering the dried alga;
   forming a homogeneous aqueous slurry including said alkaline treated powdered metal ion-binding alga; and
   selectively contacting said slurry with an acidic solution to form an insoluble composition containing said metal ion-binding alga.

56. The method of claim 55 wherein the alkaline treated powdered alga comprises an alkaline treated algal powder of less than 100 mesh.

57. The method of claim 55 wherein the alkaline treated powdered alga comprises a red alga.

58. The method of claim 57 wherein the red alga is selected from the algal division, Rhodophycophyta.

59. The method of claim 58 wherein the red alga is Euchema sp.

60. The method of claim 55 wherein said aqueous slurry includes in addition to said alkaline treated powdered alga, a powder of another metal ion-binding microorganism.

61. The method of claim 60 wherein said powder of another metal ion-binding microorganism comprises a powder of a blue-green alga.

62. The method of claim 61 wherein the blue-green alga is Spirulina sp.

63. A method for immobilization of metal ion-binding algae comprising the steps of:
mixing a powdered metal ion-binding alga with an alkaline solution to form a slurry; and
contacting the slurry with an acid to form an insoluble composition containing said metal ion-binding alga.

64. The method of claim 63 wherein the powdered alga comprises an algal powder of less than 100 mesh.

65. The method of claim 63 wherein the algal powder comprises a powder of a red alga.

66. The method of claim 63 wherein the alkaline solution comprises sodium hydroxide.

67. The method of claim 66 wherein the acid has a pH of about 4 to about 1.

68. A method of improving the metal ion-binding capacity of a composition containing immobilized metal ion-binding microorganisms comprising:
forming said composition by exposure of an insoluble material containing said immobilized metal ion-binding microorganisms to an elevated temperature in the range about 300° C. to about 500° C.; and
washing said resultant insoluble material with an alkaline solution.

69. The method of claim 68 wherein the elevated temperature is about 400° C.

70. A composition, useful for extraction of (i) metal ions from an aqueous solution at ambient temperatures and (ii) metal ions from geothermal fluids at about geothermal temperatures, comprising immobilized metal ion-binding microorganisms wherein the composition is formed by exposing an insoluble material including the immobilized metal ion-binding microorganisms to an elevated temperature in the range of about 300° C. to about 500° C. for a selected period of time.

71. The composition of claim 70 wherein the insoluble material including immobilized metal ion-binding microorganisms misformed in a process including the steps of:
i) combining a powdered metal ion-binding microorganism and an alkaline solution to form a homogeneous mixture; and
ii) contacting the mixture with a metal-containing solution to form an insoluble material containing said immobilized metal ion-binding microorganisms.

72. The composition of claim 71 wherein the metal in the metal-containing solution has a valence greater than or equal to two.

73. The composition of claim 71 wherein formation of the insoluble material containing immobilized metal ion-binding microorganisms further comprises washing the insoluble material prior to exposing the insoluble material to said elevated temperature for the selected period of time.

74. The composition of claim 70 wherein the elevated temperature is about 400° C.

75. The composition of claim 73 wherein formation of the insoluble material containing immobilized metal ion-binding microorganisms further comprises the step of drying the washed insoluble material for a selected period of time to form the insoluble material that is exposed to said elevated temperature.

76. The composition of claim 75 wherein the alkaline solution comprises sodium hydroxide.

77. The composition of claim 75 wherein the metal ion-binding microorganisms comprise an alga.

78. The composition of claim 77 wherein the algal powder comprises a powder of a brown alga.

79. The composition of claim 78 wherein the brown alga is selected from the algal division, Phaeophycrophyta.

80. The composition of claim 79 wherein the brown alga is selected from the group consisting of Laminaria sp., Eisenia sp. and Alaria sp.

81. The composition of claim 80 wherein the alga is aria sp.

82. The composition of claim 80 wherein the alga is Eisenia sp.

83. The composition of claim 80 wherein the alga is Alaria sp.

84. The composition of claim 77 wherein the algal powder comprises a powder of red alga.

85. The composition of claim 84 wherein the red alga is selected from the algal division, Rhodophycophyta.

86. The composition of claim 85 wherein the red alga is selected from the group consisting of Euchema sp. and Porphyra sp.

87. The composition of claim 86 wherein the red alga is Euchema sp.

88. The composition of claim 86 wherein the red alga is Porphyra sp.

89. The composition of claim 70 wherein the formation of two insoluble material containing immobilized metal ion-binding microorganisms includes the steps of:
i) combining a powdered first metal ion-binding microorganisms and an alkaline solution to form a mixture;
ii) combining second metal ion-binding microorganisms with the mixture to form a slurry; and
iii) contacting the slurry with a metal-containing solution to form an insoluble material containing said immobilized metal ion-binding microorganisms.

90. The composition of claim 89 wherein the formation of the insoluble material containing immobilized metal ion-binding microorganisms further comprises washing the insoluble material prior to exposing the insoluble material to said elevated temperature for the selected period of time.

91. The composition of claim 90 wherein formation of the insoluble material containing immobilized metal ion-binding microorganisms further comprises the step of drying the washed insoluble material for a selected prior of time to form the insoluble material that is exposed to said elevated temperature.

92. The composition of claim 91 wherein the second metal ion-binding microorganisms comprise microorganisms of at least one algal species.

93. The composition of claim 92 wherein the at least one algal species comprises a brown alga.

94. The composition of claim 93 wherein the brown alga is selected from the algal division, Phaeophycrophyta.

95. The composition of claim 94 wherein the brown alga is selected from the group consisting of Laminaria sp., Eisenia sp. and Alaria sp.

96. The composition of claim 95 wherein the alga is Laminaria sp.

97. The composition of claim 95 wherein the alga is Eisenia sp.

98. The composition of claim 95 wherein the alga is Alaria sp.

99. The composition of claim 92 wherein the at least one algal species comprises a green alga.

100. The composition of claim 99 in the green alga is Chlorella sp.

101. The composition of claim 92 wherein the at least one algal species comprises a blue-green alga.

102. The composition of claim 101 wherein the blue-green alga is Spirulina sp.

103. The composition of claim 92 in the at least one species comprises a red alga.

104. The composition of claim 103 wherein the red alga is selected from the algal division, Rhodophycophyta.

105. The composition of claim 104 wherein the red alga is selected from the group consisting of Euchema sp. and Porphyra sp.

106. The composition of claim 105 wherein the red alga is Euchema sp.

107. The composition of claim 105 wherein the red alga is Porphyra sp.

108. The composition of claim 92 wherein the at least one algal species comprises Cyanidium sp.

109. The composition of claim 89 wherein the powder of first metal ion-binding microorganisms comprises an algal powder.

110. The composition of claim 109 wherein the algal powder comprises a powder of a brown alga.

111. The composition of claim 110 wherein the brown is selected from the algal division, Phaeophycophyta.

112. The composition of claim 111 wherein the brown alga is selected from the group consisting of Laminaria sp., Eisenia sp. and Alaria sp.

113. The composition of claim 112 wherein the alga is Laminaria sp.

114. The composition of claim 112 wherein the alga is Eisenia sp.

115. The composition of claim 112 wherein the alga is Alaria sp.

116. The composition of claim 109 wherein the algal powder comprises a powder of a red alga.

117. The composition of claim 116 wherein the red alga is selected from the algal division, Rhodophycophyta.

118. The composition of claim 117 wherein the red alga is selected from the group consisting of Euchema sp. and Porphyra sp.

119. The composition of claim 118 wherein the red alga is Euchema sp.

120. The composition of claim 118 wherein the red alga is Porphyra sp.

121. The composition of claim 70 wherein the insoluble material containing immobilized metal ion-binding microorganisms is formed in a process including the steps of:
i) combining an algal powder and an alkaline solution to form a mixture; and
ii) contacting the mixture with an acid to form an insoluble material.

122. The composition of claim 121 wherein the formation of the insoluble material containing immobilized metal ion-binding microorganisms further comprises washing the insoluble material prior to exposing the insoluble material to said elevated temperature for the selected period of time.

123. The composition of claim 122 wherein formation of the insoluble material containing immobilized metal ion-binding microorganisms further comprises the step of drying the washed insoluble material for a selected prior of time to form the insoluble material that is exposed to said elevated temperature.

124. The composition of claim 123 wherein the algal powder comprises a powder of a red alga.

125. The composition of claim 20 wherein the insoluble material containing immobilized metal ion-binding microorganisms is formed in a process including the steps of:
i) forming an alkaline treated powdered metal ion-binding alga by washing alga in an alkaline solution, drying the washed alga, and powdering the dried alga;
ii) combining said alkaline treated alga powder and water to form a mixture;
iii) combining other metal ion-binding microorganisms with the mixture to form a slurry; and
iv) contacting the slurry with an acid to form an insoluble material containing said immobilized metal ion-binding microorganisms.

126. The composition of claim 125 wherein the formation of the insoluble material containing immobilized metal ion-binding microorganisms further comprises washing the insoluble material prior to exposing the insoluble material containing immobilized metal ion-binding microorganisms to said elevated temperature for the selected period of time.

127. The composition of claim 126 wherein formation of the insoluble material containing immobilized metal ion-binding microorganisms further comprises the step of drying the washed insoluble material for a selected period of time to form the insoluble material that is exposed to said elevated temperature.

128. The composition of claim 70 wherein the formation of the composition further comprises washing the composition with an alkaline solution after the exposure to said elevated temperature for said selected period of time.

129. A method for forming a composition, useful for extraction of (i) metal ions from an aqueous solution at ambient temperatures and (ii) metal ions from geothermal fluids at about geothermal temperatures, comprising immobilized metal ion-binding microorganisms comprising the steps of:
forming an a insoluble material containing the immobilized metal ion-binding microorganisms; and
heating said insoluble material at an elevated temperature in the range of about 300° C. to about 500° C. for a selected period of time.

130. The method of claim 129 wherein the elevated temperature is about 400° C.

131. The method of claim 129 wherein the step of forming the insoluble material containing immobilized metal ion-binding microorganisms includes the steps of:
(i) combining a powdered metal ion-binding microorganism and an alkaline solution to form a homogeneous mixture; and
ii) contacting the mixture with a metal-containing solution to form an insoluble material containing said immobilized metal ion-binding microorganisms.

132. The method of claim 131 wherein the metal in the metal-containing solution has a valence greater than or equal to two.

133. The method of claim 131 wherein the step of forming the insoluble material containing immobilized metal ion-binding microorganisms further comprises the step of washing the insoluble material.

134. The method of claim 133 wherein the step of forming the insoluble material containing immobilized metal ion-binding microorganisms further comprises the step of drying the washed insoluble material.

135. The method of claim 134 wherein the alkaline solution comprises sodium hydroxide.

136. The method of claim 134 wherein the metal ion-binding microorganisms comprises an alga.

137. The method of claim 129 wherein the step of forming the insoluble material containing immobilized metal ion-binding microorganisms includes the steps of:
  i) combining a powdered first metal ion-binding microorganisms and an alkaline solution to form a mixture;
  ii) combining second metal ion-binding microorganisms with the mixture to form a slurry; and
  iii) contacting the slurry with a metal-containing solution to from an insoluble material containing said immobilized metal ion-binding microorganisms.

138. The method of claim 137 wherein the step of forming the insoluble material containing immobilized metal ion-binding material further comprises the step of washing the insoluble material.

139. The method of claim 138 wherein the step of forming the insoluble material containing immobilized metal ion-binding microorganisms further comprises the step of drying the washed insoluble material.

* * * * *